(12) United States Patent
Fong et al.

(10) Patent No.: US 12,108,382 B2
(45) Date of Patent: Oct. 1, 2024

(54) SCHEDULING FOR SIDELINK COMMUNICATIONS

(71) Applicant: QUALCOMM Incorporated, San Diego, CA (US)

(72) Inventors: Lik Hang Silas Fong, Bridgewater, NJ (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 17/450,828

(22) Filed: Oct. 13, 2021

(65) Prior Publication Data

US 2023/0109809 A1   Apr. 13, 2023

(51) Int. Cl.
| | |
|---|---|
| *H04W 72/1263* | (2023.01) |
| *H04L 1/18* | (2023.01) |
| *H04L 5/00* | (2006.01) |
| *H04W 72/20* | (2023.01) |
| *H04W 72/25* | (2023.01) |
| *H04W 72/40* | (2023.01) |

(52) U.S. Cl.
CPC ....... *H04W 72/1263* (2013.01); *H04W 72/20* (2023.01)

(58) Field of Classification Search
CPC .......................... H04W 72/1263; H04W 72/20
USPC .......................................................... 370/329
See application file for complete search history.

(56) References Cited

U.S. PATENT DOCUMENTS

| | | | | |
|---|---|---|---|---|
| 2020/0403737 | A1* | 12/2020 | Yeo | H04L 1/1861 |
| 2020/0404624 | A1* | 12/2020 | Roth | H04L 5/0044 |
| 2021/0219268 | A1* | 7/2021 | Li | H04W 72/20 |
| 2021/0266951 | A1 | 8/2021 | Gulati et al. | |
| 2021/0306824 | A1* | 9/2021 | Li | H04W 4/40 |

(Continued)

FOREIGN PATENT DOCUMENTS

| | | | | |
|---|---|---|---|---|
| EP | 4093132 A1 | 11/2022 | | |
| EP | 4156833 A1 * | 3/2023 | | H04L 1/1812 |
| WO | 2021167427 A1 | 8/2021 | | |

OTHER PUBLICATIONS

3GPP: "5G, NR, Multiplexing and Channel Coding (3GPP TS 38.212 version 16.7.0 Release 16)", ETSI Technical Specification, European Telecommunications Standards Institute, 650, Route Des Lucioles, F-06921 Sophia-Antipolis, France, vol. RAN, No. V16.7.0, Oct. 11, 2021, 157 Pages, XP014417310, Section 16.3.

(Continued)

*Primary Examiner* — Xuan Lu
(74) *Attorney, Agent, or Firm* — Patterson + Sheridan, LLP

(57) ABSTRACT

Certain aspects of the present disclosure provide techniques for communicating and scheduling communications over sidelink. Certain aspects of the disclosure relate to a method for wireless communication by a user equipment (UE). In some examples, the method includes transmitting, to one or more other UEs, first control information comprising an indicator of a starting time and a duration of a first time interval for communication of a first data transmission over a sidelink, wherein the first time interval comprises one or more time periods of a first time window. In some examples, the method includes transmitting the first data transmission to at least one of the one or more other UEs during the first time interval.

31 Claims, 12 Drawing Sheets

(56) References Cited

U.S. PATENT DOCUMENTS

2023/0087401 A1* 3/2023 Shin ................. H04L 5/0037
370/329

OTHER PUBLICATIONS

3GPP TS 36.331: "3rd Generation Partnership Project, Technical Specification Group Radio Access Network, LTE, Evolved Universal Terrestrial Radio Access, Radio Resource Control, Protocol specification (Release 16)", Technical Specification, Mobile Competence Centre, 650, Route Des Lucioles, F-06921 Sophia-Antipolis Cedex, France, vol. RAN WG2, No., V16.6.0(Oct. 2021), Sep. 29, 2021, 1098 Pages, XP052056891, p. 422, 425, 848.
3GPP TS 38.213: "3rd Generation Partnership Project, Technical Specification Group Radio Access Network, NR, Physical Layer Procedures For Control (Release 16)", Mobile Competence Centre, ETSI ,650, Route Des Lucioles, F-06921 Sophia-Antipolis Cedex, France, vol. RAN WG1, No. ETSI TS 138 213 V16.7.0 (Oct. 2021), Sep. 28, 2021, 191 Pages, XP052056878, Paragraph 10.4, Section 8.4.
International Search Report and Written Opinion—PCT/US2022/076155—ISA/EPO—Jan. 20, 2023.

* cited by examiner

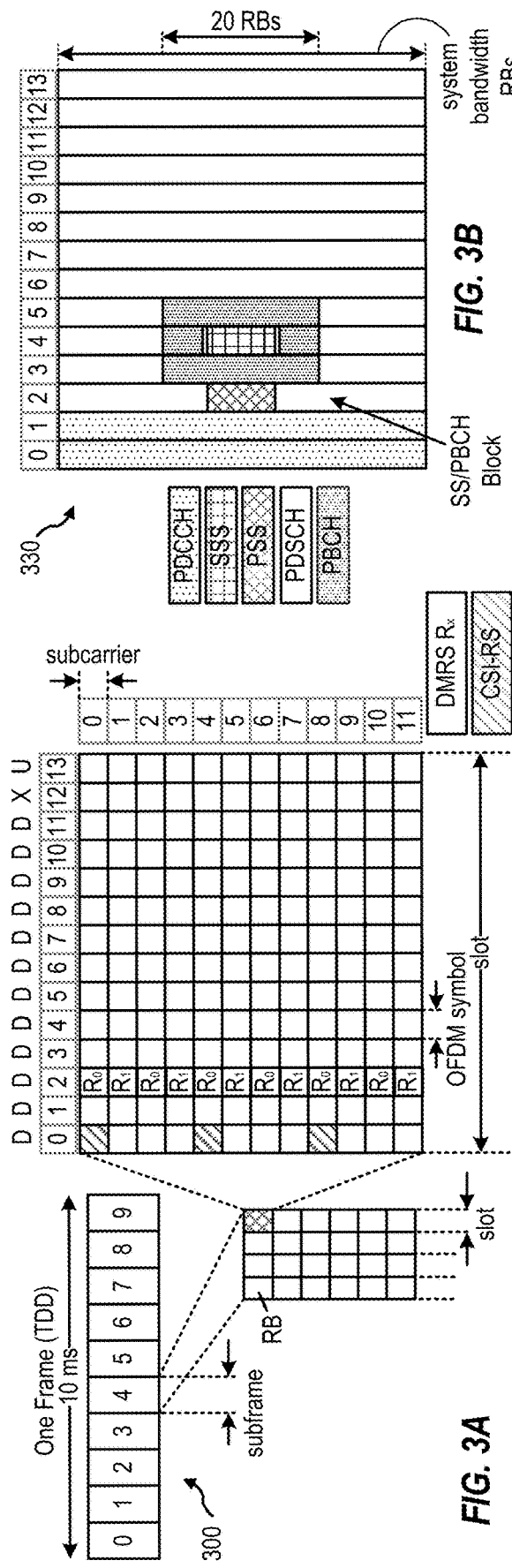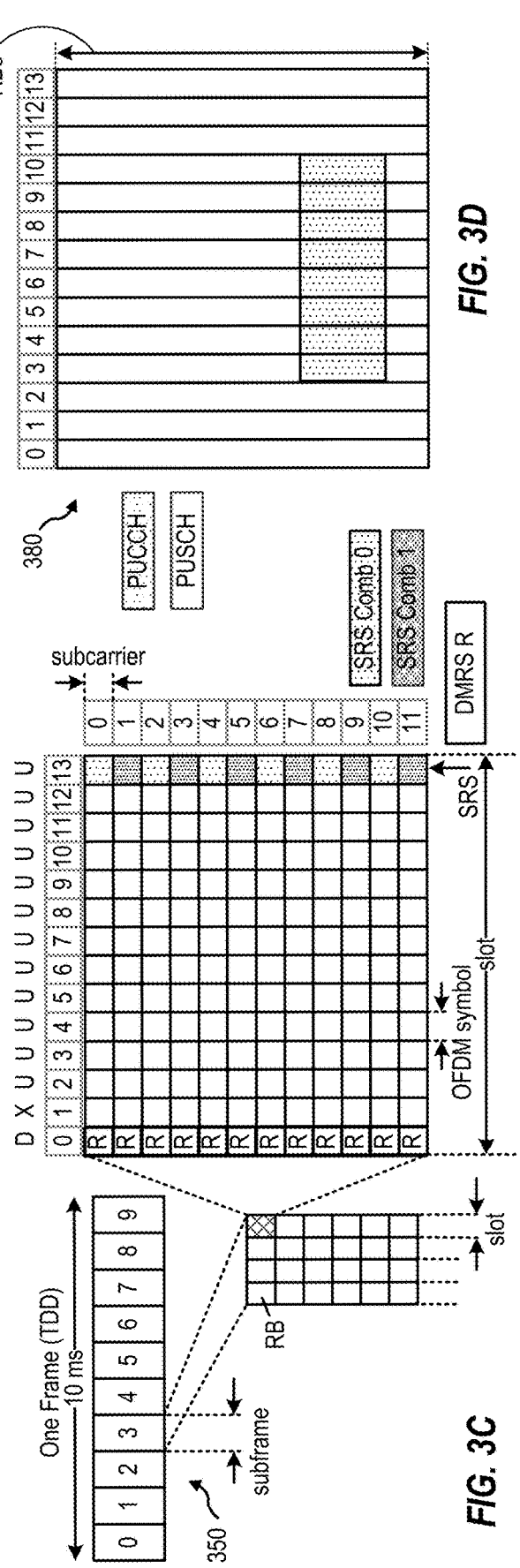

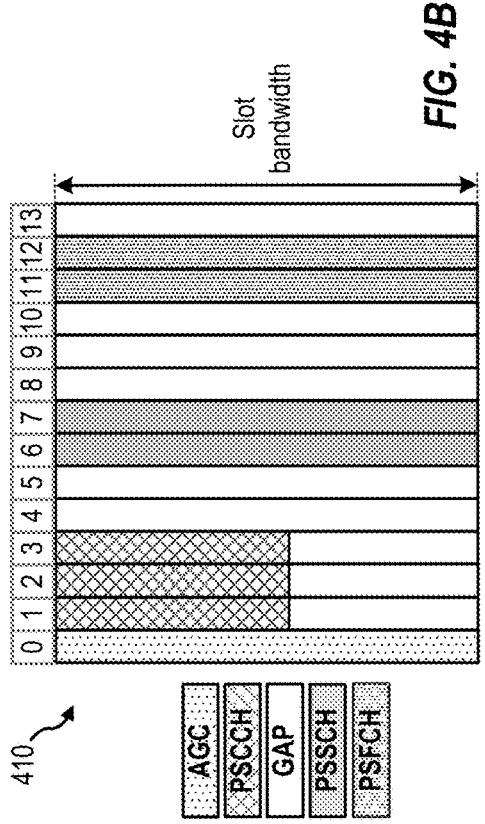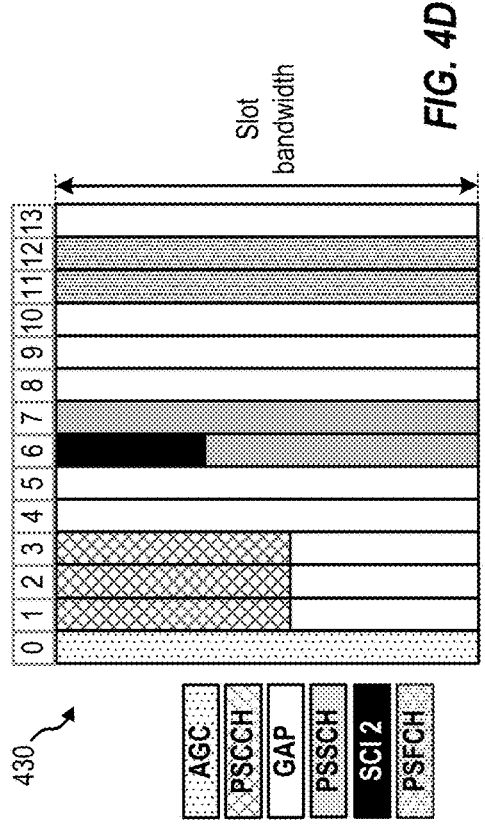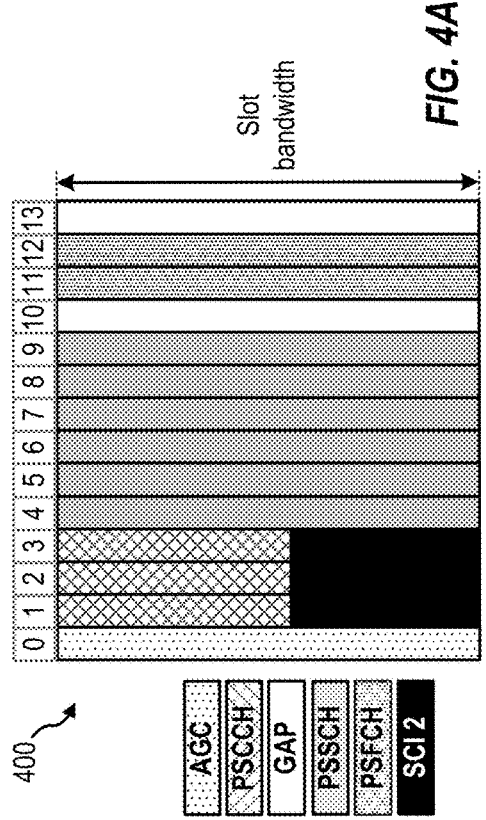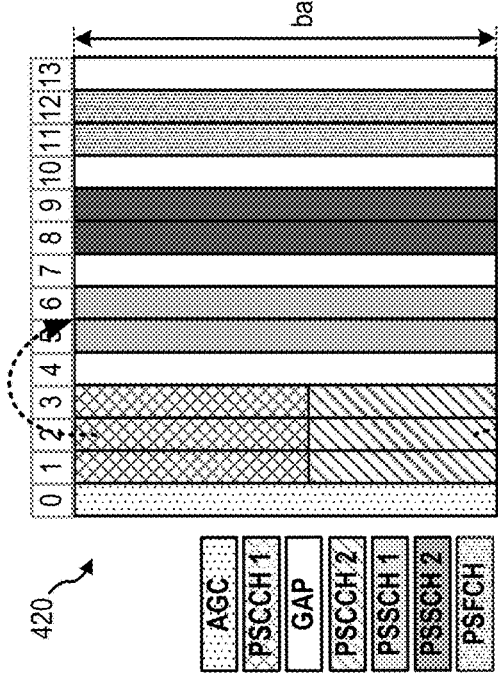

SCHEDULING FOR SIDELINK COMMUNICATIONS

INTRODUCTION

Aspects of the present disclosure relate to wireless communications, and more particularly, to techniques for scheduling and communicating over sidelink.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects are directed to a method of wireless communication by a first user equipment (UE). In some examples, the method includes transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the method includes transmitting the first data transmission to at least one of the one or more other UEs during the first time interval.

Certain aspects are directed to a method of wireless communication by a first user equipment (UE). In some examples, the method includes receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the method includes, receiving the first data transmission from the other UE during the first time interval.

Certain aspects are directed to a first user equipment (UE) configured for wireless communication, wherein the first UE includes a memory and a processor coupled to the memory. In some examples, the memory and the processor are configured to cause the first UE to transmit, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the memory and the processor are configured to cause the first UE to transmit the first data transmission to at least one of the one or more other UEs during the first time interval.

Certain aspects are directed to a first user equipment (UE) configured for wireless communication, wherein the first UE includes a memory and a processor coupled to the memory. In some examples, the memory and the processor are configured to cause the first UE to receive, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the memory and the processor are configured to cause the first UE to receive the first data transmission from the other UE during the first time interval.

Certain aspects are directed to a first user equipment (UE) configured for wireless communication. In some examples, the first UE includes means for transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the first UE includes means for transmitting the first data transmission to at least one of the one or more other UEs during the first time interval.

Certain aspects are directed to a first user equipment (UE) configured for wireless communication. In some examples, the first UE includes means for receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the first UE includes means for receiving the first data transmission from the other UE during the first time interval.

Certain aspects are directed to a non-transitory computer-readable medium having instructions stored thereon that, when executed by a first user equipment (UE), cause the first UE to perform operations. In some examples, the operations include transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the operations include transmitting the first data transmission to at least one of the one or more other UEs during the first time interval.

Certain aspects are directed to a non-transitory computer-readable medium having instructions stored thereon that, when executed by a first user equipment (UE), cause the first UE to perform operations. In some examples, the operations include receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback. In some examples, the operations include receiving the first data transmission from the other UE during the first time interval.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIGS. 4A-4D depict various example aspects of data structures for sidelink communications in a wireless communication.

DETAILED DESCRIPTION

Aspects of the present disclosure provide apparatuses, methods, processing systems, and computer-readable mediums for scheduling sidelink communications.

As an example, mission critical wireless communications are defined by strict latency and reliability requirements. For example, a latency requirement may be between 1-2 milliseconds (ms), and a reliability requirement may be $10^{-6}$ (e.g., no more than a 0.000001 error rate). Thus, in order to meet these latency and reliability requirements in sidelink communications, both data and control channels may need to be designed to meet the requirements.

In certain aspects, techniques discussed herein allow time and frequency resources used to communicate data and control information over sidelink to be reduced in size. Such techniques may be useful, for example, in an industrial application (e.g., industrial interne of things (IIoT). For example, a first device may wirelessly communicate with a second device using a sequence of time windows, wherein during one or more of the sequence of time windows, the first device transmits at least: (i) a data transmission, and (ii) control information for scheduling the same or another data transmission. However, according to the techniques described, the first device may be allowed to transmit multiple data transmissions and multiple instances of control information during a single time window.

Moreover, reducing the time and frequency resources used to communicate data and control information enables a more rapid feedback response from, for example, the second device in response to the data and control information transmitted by the first device. For example, if the second UE receives a data transmission from the first device during a first time window, the second UE may transmit feedback to the data transmission in the same first time window. This is due, in part, to the fact that in some examples, the reduction of time and frequency resources used to communicate data providing the second device with enough time to receive the data and respond to the data in the same time window. Furthermore, reducing the time and frequency resources used to communicate data and control information enables the first device to schedule, within the first window, data transmissions by the second device to occur within the same first window.

By reducing the amount of resources used for communicating data and control information, additional data and control information may be communicated over a given period of time, thereby improving throughput of the system, as well as the system's ability to meet the strict latency and reliability requirements of mission critical communications.

Such techniques may allow sidelink communications to meet strict mission critical wireless communications standards.

Introduction to Wireless Communication Networks

Figure 1:
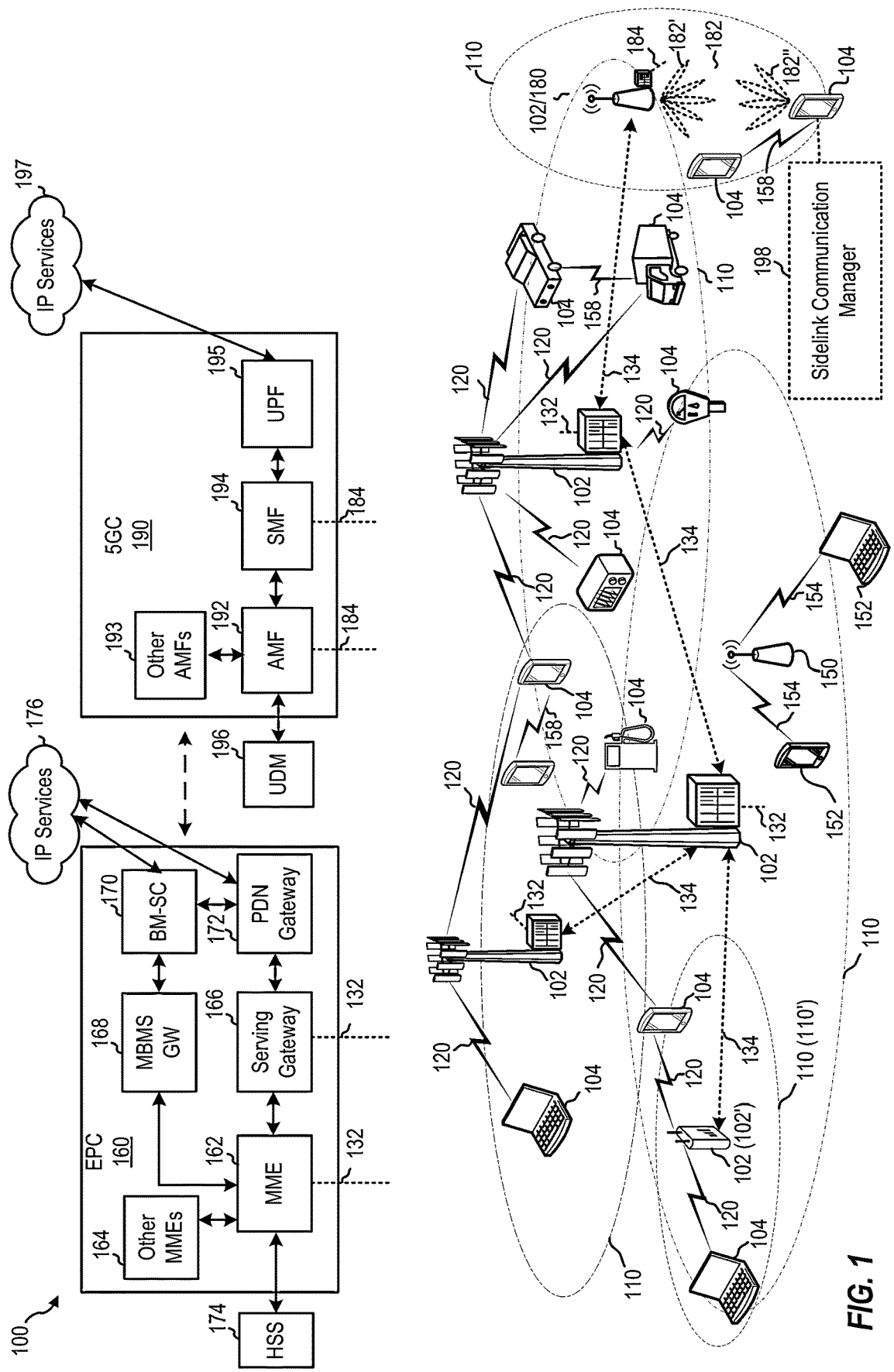
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Certain UEs 104 may communicate with each other using a device-to-device (D2D) communication link 158. The D2D communication link 158 may use a PC5 interface via a DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

Sidelink signals may be used between UEs 104 without necessarily relying on scheduling or control information from a BS 102. For example, two or more UEs 104 may communicate with each other using peer to peer (P2P) or a D2D communication link 158 without relaying that communication through a BS 102. In a further example, a first UE in a sidelink communication may function as a primary sidelink device (e.g., a device capable of scheduling sidelink communications), and a second UE in the sidelink communication may function as a non-primary (e.g., secondary) sidelink device. In still another example, the first UE and the second UE may function in a D2D, peer-to-peer (P2P), cellular vehicle-to-everything (CV2X) network, and/or in a mesh network. In a mesh network example, the first UE and the second UE may optionally communicate directly with one another in addition to communicating with a BS 104. Thus, in a wireless communication system with scheduled access to time-frequency resources and having a cellular configuration, a D2D configuration, or a mesh configuration, a primary sidelink device and/or a BS, and one or more UEs may communicate utilizing the scheduled resources.

Wireless network 100 further includes sidelink communication manager 198, which may be used and configured to schedule and communicate over sidelink.

Figure 2:
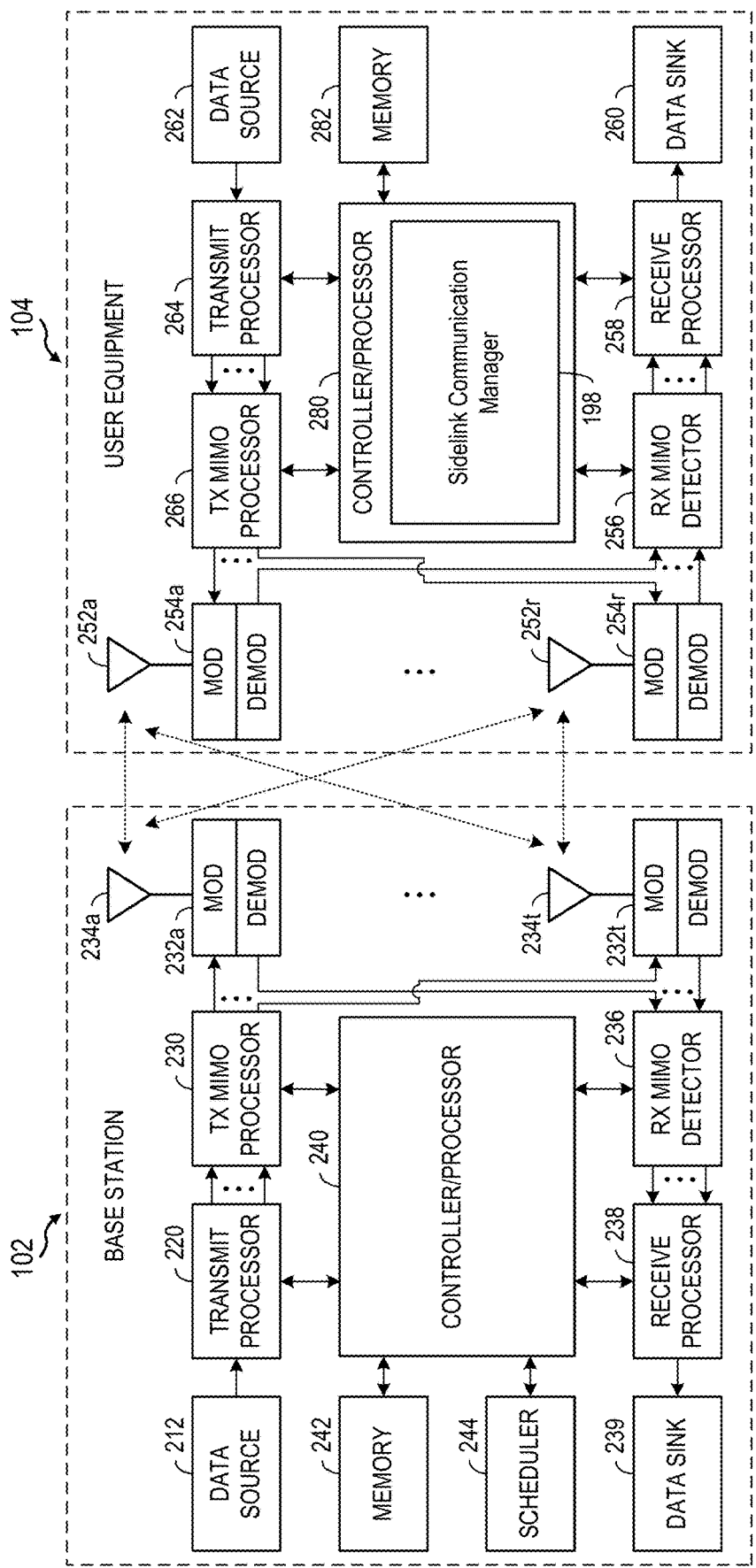
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104. Base station 102 includes controller/processor 240, which may be configured to implement various functions related to wireless communications.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes sidelink communication manager 198. Notably, while depicted as an aspect of controller/processor 280, sidelink communication manager 198 may be implemented additionally or alternatively in various other aspects of user equipment 104 in other implementations.

While aspects of the disclosure relate to the various cellular communication environments described above and illustrated in FIG. 1, the techniques described herein are also be applicable V2X environments, as well as industrial internet of things (IIoT) environments. In any of the foregoing environments, communication of mission critical data communications may be required.

In certain aspects, mission critical data (or in some examples, machine critical data) refers to data that has a relatively low or ultra-low latency requirement. For example, the latency requirement of mission critical data may be lower than the latency requirement of other data communicated by the same device. Generally, latency refers to the delay associated with receipt of data at its intended destination. In certain aspects, mission critical data refers to data that has a relatively high priority requirement. For example, the priority requirement of mission critical data may be higher than the priority requirement of other data communicated by the same device. Generally, priority refers to the importance or time-sensitivity of the data. Data having relatively higher importance and/or relatively greater time-sensitivity should be received before other data having relatively lesser importance and/or relatively lesser time-sensitivity. In certain aspects, mission critical data refers to data that has a relatively high reliability requirement. For example, the reliability requirement of mission critical data may be greater than the reliability requirement of other data communicated by the same device. Generally, reliability refers to how consistently data is successfully received by the intended destination without errors.

FIGS. 3A-3D are schematic diagrams illustrating aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G slot, FIG. 3C is a diagram 350 illustrating an example of a second subframe within a 5G frame structure, and FIG. 3D is a diagram 380 illustrating an example of UL channels within a 5G slot.

Further discussions regarding FIG. 1, FIG. 2, and FIGS. 3A-3D are provided later in this disclosure.

FIGS. 4A-4D are schematic diagrams illustrating example slot structures for sidelink communications in a wireless communication network, such as wireless communication network 100 of FIG. 1. Each of FIGS. 4A-4D illustrates an example sidelink slot (400, 410, 420, 430) made up of 14 symbols numbered 0 through 13, though a slot may include a different number of symbols, and the symbols may be used for different communication than the specific examples discussed. The first symbol (e.g., symbol 0) of each sidelink slot may be used as an automatic gain control (AGC) symbol. Each of the example sidelink slots include a slot bandwidth that may include one or more subchannels (e.g., multiple subchannels within a sidelink channel). The example slot structures of FIGS. 4A-4D may be used to transmit data, such as mission critical data in cellular network environments, including V2X and IIoT, for example. As used throughout this disclosure, a "time window" may relate to a slot or other suitable time duration, a "time period" may relate to a symbol or other suitable time duration, and a "time interval" may relate to a number of contiguous time periods (e.g., one or more time periods).

Each of the example sidelink slots include various control and data channels. For example, the sidelink slots may include one or more PSCCHs configured to carry sidelink control information (SCI) within one or more control channel elements (CCEs). In some examples, a UE may transmit an SCI stage 1 (e.g., SCI1) message within a PSCCH to reserve time-domain and frequency-domain resources for up to three future PSSCH transmissions, including a future PSSCH transmission within the same slot as the SCI1 message or a different slot as the SCI1 message. SCI1 may also include information for decoding an SCI stage 2 (e.g., SCI2) message communicated within one or more of the future PSSCH transmissions. In some examples, an SCI2 message may include at least information for determining the intended recipient of the PSSCH transmission. For example, to allow for receiving devices to determine the intended recipient of the PSSCH, the SCI2 may be modulated using a DMRS associated with a specific receiving UE. That specific receiving UE may thus be able to successfully demodulate the SCI2 and determine that it is the intended recipient of the PSSCH by having been able to successfully demodulate the SCI2; other receiving devices, in contrast, may not be able to demodulate the SCI2 and may thus determine that they are not the intended recipient.

Each of the example sidelink slots also include one or more PSSCHs configured to carry sidelink data. As illustrated, a single PSSCH may span several symbols, or multiple instances of PSSCHs can be separated by gap symbols to prevent interference caused by overlapping instances of sidelink data, or sidelink data overlapping with a feedback transmission, for example. The gap symbols also allow time for radio frequency (RF) front-end circuitry of a transmitting UE 104 to be reconfigured for a next transmission over another PSSCH. In some examples, the transmitting UE 104 may transmit padding resource blocks (RBs) over one or more of the gap symbols. That is, padding may be transmitted over unused resources to support proper decoding of the transmission, as well as reduce interference.

Each of the example sidelink slots also includes multiple symbols for feedback transmission over PSFCH. Similar to the PSSCHs, the PSFCH may be separated from other channels by gap symbols to help prevent overlapping transmissions from multiple devices. For example, the PSFCH may be transmitted in response to a scheduled PSSCH, and can carry feedback related to the successful or failed reception of the PSSCH.

In particular, FIG. 4A illustrates an example of a first sidelink slot 400. As illustrated, symbols 1-3 carry a PSCCH and a PSSCH. The PSCCH may be transmitted over a first subchannel (e.g., corresponding to a first frequency bandwidth of a channel), and the PSSCH may be transmitted over a second subchannel (e.g., corresponding to a second frequency bandwidth of a channel). As shown, the PSSCH of symbols 1-3 carries an SCI2 message associated with the PSCCH of the first sidelink slot 400. Transmission of the PSSCH may continue over both the first subchannel and the second subchannel over symbols 4-9.

FIG. 4B illustrates an example of a second sidelink slot 410. The second sidelink slot 410 is similar to the first sidelink slot 400; however, in this example, the PSSCH transmission is relatively shorter than the PSSCH of the first sidelink slot 400 in that it requires fewer time-domain resources. In this example, the shorter PSSCH may provide time for a UE that receives the PSSCH time to transmit feedback related to the successful or failed reception of the shorter PSSCH within the same slot.

FIG. 4C illustrates an example of a third sidelink slot 420. In this example, a first subchannel is used to transmit a first PSCCH (e.g., PSCCH 1) and a second subchannel is used to transmit a second PSCCH (e.g., PSCCH 2) over symbols 1-3. Here, PSCCH 1 is configured to reserve a first PSSCH resource (e.g., PSSCH 1), and PSCCH 2 is configured to reserve a second PSSCH resource (e.g., PSSCH 2) of the same slot. Both PSSCH 1 and PSSCH 2 occupy two consecutive symbols.

FIG. 4D illustrates an example of a fourth sidelink slot 430. In this example, the fourth sidelink slot 430 is similar to the second sidelink slot 410 of FIG. 4B; however, in this example, an SCI2 message is contained within the short PSSCH transmission. Here, the SCI2 message is contained in the initial time-domain and frequency-domain resources (e.g., an earliest frequency and time interval being adjacent and after the gap of symbol 5) in the beginning of the PSSCH transmission. It should be noted that the SCI2 message location of the fourth sidelink slot 430 can also be used in sidelink slot configurations wherein a single slot contains multiple short PSSCH transmissions. That is, each of the multiple short PSSCH transmissions may include a corresponding SCI2 message.

It should be noted that the configurations illustrated are examples, and are not meant to be limiting. For example, although the PSCCHs are shown as occupying three consecutive symbols, other configurations appreciated by this disclosure include one of more PSCCHs that occupy any suitable number of symbols, including one. Similarly, PSSCHs and PSFCHs may occupy any suitable number of symbols, including one.

Figure 5:
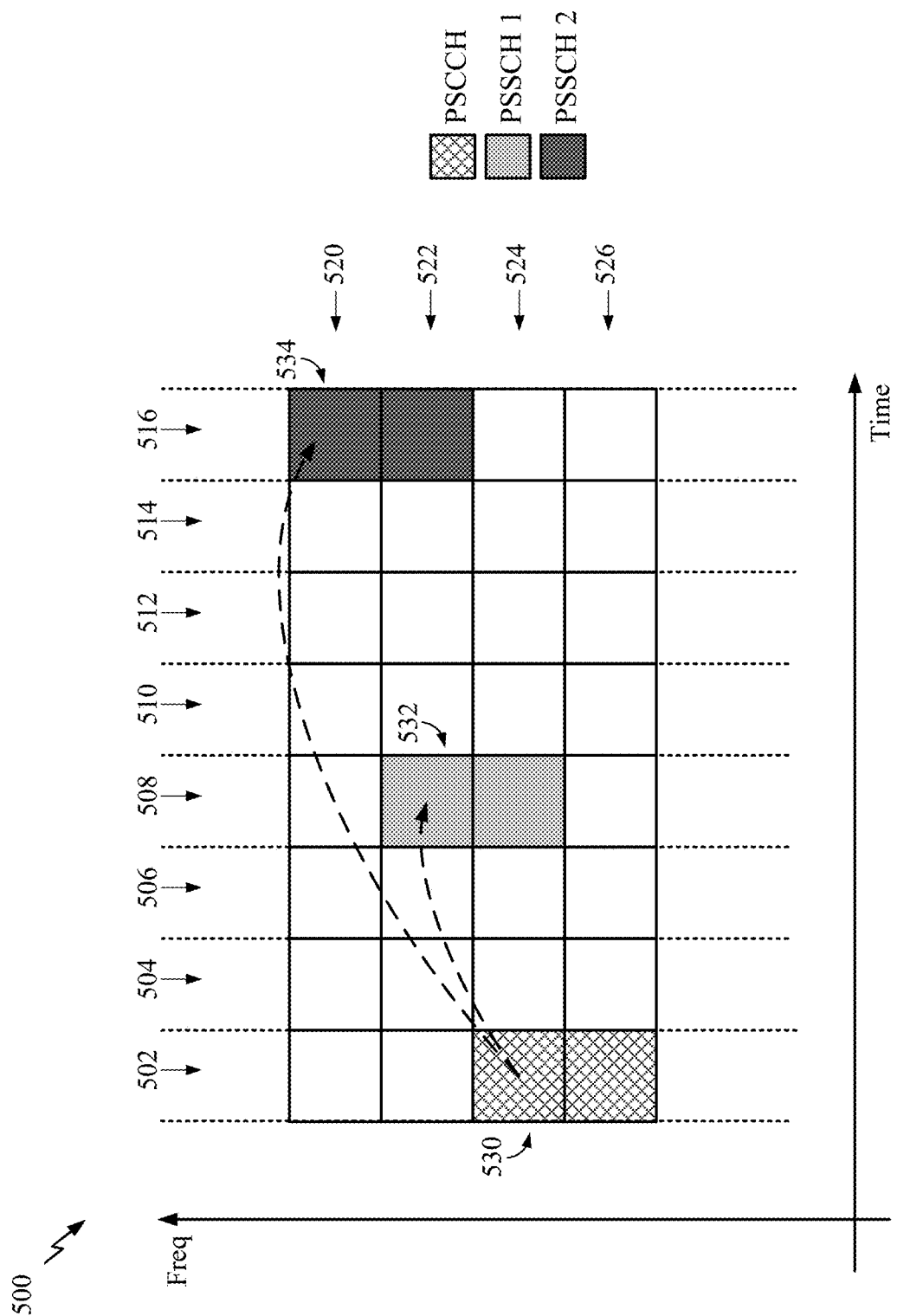
FIG. 5 is an example transmission timeline illustrating transmissions and resource reservations by a user equipment (UE).

FIG. 5 is an example transmission timeline 500 illustrating transmissions and resource reservations by a UE (e.g., UE 104 of FIGS. 1 and 2), in accordance with aspects of the present disclosure. In the example transmission timeline, the UE transmits a sidelink transmission 530 during a first slot 502 on a first subchannel 526 and a second subchannel 524. In certain aspects, the sidelink transmission 530 includes data and control information that may be sent in a PSSCH and PSCCH, respectively, though only control information in a PSCCH is shown. The control information may include a first SCI (e.g., SCI1) for reserving first transmission resources 532 on the second subchannel 524 and a third subchannel 522 during a second slot 508. The control information may also reserve second transmission resources 534 on the third subchannel 522 and a fourth subchannel 520 during a third slot 516. In some examples, a second SCI may be used to reserve the second transmission resources 534.

In certain aspects, the first transmission resources 532 and/or the second transmission resources 534 may be reserved for retransmissions of the data of the sidelink transmission 530. Though the sidelink transmission 530 is shown on two subchannels as an example, it should be noted the sidelink transmission may occur on any suitable number of one or more subchannels. Further, the control information may reserve any suitable number of one or more resources across any suitable number of subchannels and slots. A resource, in certain aspects, is a time-frequency resource.

In certain aspects, channel access and resource reservation may be based on sensing of a channel (e.g., comprising one or more subchannels) by a UE with data to transmit. In an example, the UE first identifies one or more available resources for sidelink transmission, which may be referred to as one or more candidate resources. The UE then selects one or more resources, from the one or more candidate resources, for transmission, such as for data and/or control information.

In certain aspects, to identify available resources, a UE monitors and attempts to decode one or more transmissions, e.g., all transmissions, on the channel. As discussed, a transmission may include control information indicating that another UE has reserved a resource. Thus, in certain aspects, the UE attempts to decode the one or more transmissions, and based on any control information in the one or more transmissions, determines resources that have been reserved. In certain aspects, the UE determines that any resources indicated as reserved in any control information are reserved resources.

In certain aspects, the UE also measures reference signal received power (RSRP) for each of the transmissions the UE attempts to decode. In certain aspects, even if a resource is indicated as reserved in the control information of a transmission, the UE only considers the resource to be a reserved resource if the transmission is received by the UE with a RSRP above a threshold. For example, should the transmission be received with a RSRP below the threshold, then the UE from which the transmission is received may be far enough from the UE receiving the transmission that it may not cause interference for both UEs to use the same resource. Conversely, in an example, should the transmission be received with a RSRP above the threshold, then the UE from which the transmission is received may be close enough from the UE receiving the transmission that it may cause interference for both UEs to use the same resource.

In certain aspects, the UE may consider other resources that are not reserved (e.g., within a time period and on the channel) as available or candidate resources for the UE to transmit a transmission. The UE may also reserve one or multiple resources of the candidate resources by transmitting control information reserving such one or more resources.

In certain aspects, when a packet arrives for transmission (e.g., arrives at a lower protocol layer from a higher protocol layer in a protocol stack of the UE), the UE determines a sensing window (e.g., a time period in the past). The UE may have received one or more transmissions during the sensing window, which may include control information. Accordingly, in certain aspects, the UE determines reserved resources as discussed based on transmissions received during the sensing window. In certain aspects, the UE then identifies available resources in a resource selection window (e.g., a time period in the future) based on any determined reserved resources. In certain aspects, by considering the RSRP of transmission in which control information is received, the UE in a sense projects measurement outcomes from the sensing window to corresponding reserved resource(s) in the selection window.

In certain aspects, to select a resource to use for a transmission, a UE may randomly select from the available resources.

Example Sidelink Scheduling

Figure 6:
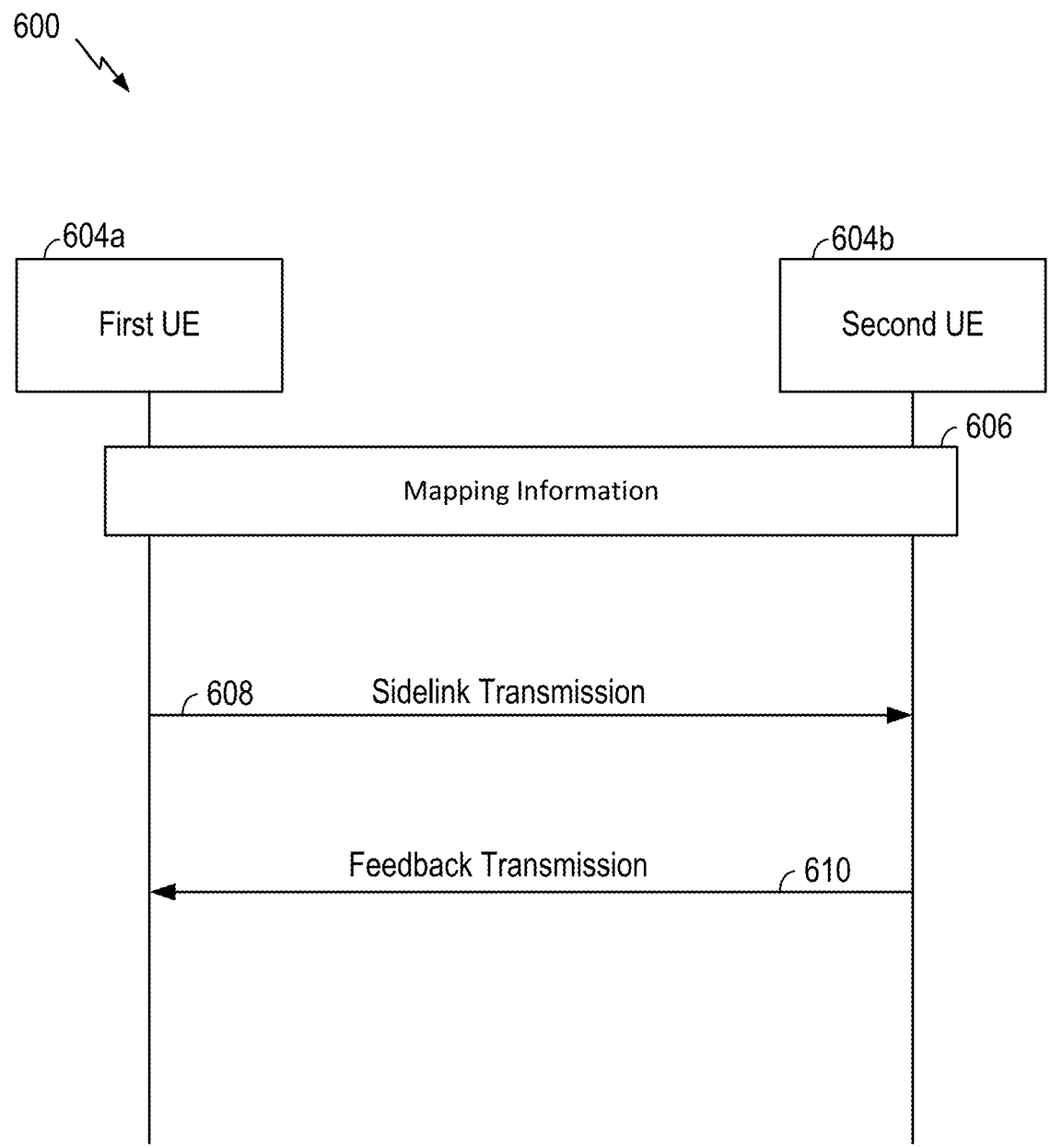
FIG. 6 is a call-flow diagram illustrating sidelink communications between a first UE and a second UE.

FIG. 6 is a call-flow diagram illustrating example communications 600, including sidelink communications (e.g., sidelink communications 158 of FIG. 1), between a first UE 604a and a second UE 604b. In certain aspects, the first UE 604a and the second UE 604b may be the UE 104 of FIGS. 1 and 2, as described in greater detail above. The first UE 604a and the second UE 604b may perform sidelink communication over a wireless interface (e.g., a PC5 interface).

Initially, the first UE 604a and the second UE 604b may be configured with mapping information 606 for scheduling sidelink communications. In one example, the first UE 604a and the second UE 604b may be pre-configured with the mapping information 606 during manufacturing of the UEs. In another example, one or more of the first UE 604a and the second UE 604b may be configured (e.g., preconfigured) with the mapping information 606 via a network (e.g., BS 102 and/or one or more core networks, such as the EPC 160 or 5GC 190 of FIG. 1, described in greater detail above). In this example, the network may configure one or both of the UEs by a downlink control information (DCI) message, a radio resource control (RRC) message, upper layer (e.g., application layer and/or IP layer) communications, or any other suitable method of communication.

During configuration of the mapping information 606, one or more of the first UE 604a and the second UE 604b may receive a mapping of offset indicator values to numbers of time windows (e.g., slots, subframes, frames, etc.) that map the offset indicator to the number of time windows. That is, the mapping information 606 may include a mapping of offset indicator values used to identify a particular time window.

For example, during a sidelink communication, the first UE 604a may transmit, via a first time window, a PSCCH to the second UE 604b, where the first UE 604a includes an offset indicator. The second UE 604b may decode the PSCCH and determine, based on the offset indicator mapping, which time window the first UE 604a reserved resources for. The offset indicator may be a one or more-bit field (e.g., a time gap field) in an SCI1 message of the PSCCH. The offset indicator may be configured to identify a particular time window for which the first UE 604a is reserving transmission resources (e.g., time-domain and frequency-domain resources for transmitting data over PSSCH).

The offset indicator mapping may be provided to one or more of the first UE 604a or the second UE 604b via an RRC message or DCI message. In a first example, the offset indicator mapping may be an explicit indicator of a number of time windows to offset. For example, if the first UE 604a intends to reserve resources in the first time window (e.g., the same time window containing the PSCCH), the offset indicator may be set to a "0" value to indicate no offset. However, if the first UE 604a intends to reserve resources in a second time window following the first time window, the offset indicator may be set to a whole number value greater than zero, where the whole number value maps to a particular time window that comes after the first time window. For example, the first UE 604a may set the offset indicator to a "1" value indicating an offset to the second time window that immediately follows the first time window, or a "2" value indicating an offset to a third time window that immediately follows the second time window.

In another example, the offset indicator mapping may be a mapping of index values to a number of time-domain resources (e.g., slots, subframes, frames, etc.) offset from the PSCCH. That is, one or more of the first UE 604a or the second UE 604b may be configured with a mapping between multiple indices (e.g., binary values or whole number values) and multiple time durations. In some examples, the mapping is a one-to-one mapping of index values to time durations. Here, if the first UE 604a intends to reserve resources in a particular time window or symbol, the first UE 604a may transmit an index value in the PSCCH of the first time window. The second UE 604b may then determine which resources are being reserved based on the time duration associated with the index value using the offset indicator mapping. For example, the index value maps to 14 symbols, then the second UE 604b may determine that the reserved resource starts 14 symbols after the last symbol of the PSCCH of the first time window.

During configuration of the mapping information 606, one or more of the first UE 604a and the second UE 604b may receive a mapping of offset indicator values to numbers of time windows that map the offset indicator to the number of time windows. That is, the mapping information 606 may include a mapping of offset indicator values used to identify a particular time window.

In some examples, if only one of the first UE 604a or the second UE 604b is configured with the mapping information, then the configured UE may transmit the mapping information to the other UE over a sidelink communication.

During configuration of the mapping information 606, one or more of the first UE 604a and the second UE 604b may receive mapping information for a start and length indicator value (SLIV). For example, as discussed in greater detail below, one or more of the UEs (e.g., the first UE 604a) may determine a location of future resources (e.g., a start time and a length of time for a transmission to the second UE 604b, such as a start symbol within a slot and a number of symbols) to reserve for a future transmission (e.g., a PSSCH transmission). The first UE 604a may then transmit a SLIV (e.g., via an SCI1 message in a PSCCH) to the second UE 604b, and the second UE 604b may use SLIV mapping information to map the SLIV to time-domain resources that indicate the starting time and duration (e.g., length) of the reserved transmission.

The network (e.g., BS 102 and/or one or more core networks, such as the EPC 160 or 5GC 190 of FIG. 1, described in greater detail above) may configure one or both of the UEs with the mapping information 606 including SLIV mapping information by DCI message, RRC message, upper layer communications, or any other suitable method of communication. If only one of the first UE 604a or the second UE 604b is configured with the SLIV mapping information, then the configured UE may transmit the SLIV mapping information to the other UE over a sidelink communication.

In certain aspects, the SLIV may be a single number used to define a start time period (e.g., a symbol) and a number of consecutive time periods for PSSCH allocation. For example, using the SLIV mapping, a start time period (e.g., $S_x$) and number of consecutive time periods (e.g., $D_x$) for a reserved resource may be determined based on a received SLIV as follows:

if$(D_x-1) \leq 7$, then $$SLIV = 14 \times (D_x-1) + S_x$$

else $$SLIV = 14 \times (14-D_x+1) + (14-1-S_x)$$

Where $0 < D_x \leq 14 - S_x$.

While the above equation may provide multiple possible $S_x$ and $D_x$ values, the SLIV mapping information may provide a mapping that that indicates specific $S_x$ and $D_x$ values. For example, the SLIV mapping information may provide the information shown in table 1:

TABLE 1

| PSSCH Mapping Type | Normal Cyclic Prefix | | | Extended Cyclic Prefix | | |
|---|---|---|---|---|---|---|
| | $S_x$ | $D_x$ | $S_x + D_x$ | $S_x$ | $D_x$ | $S_x + D_x$ |
| Type A | {0, 1, 2, 3,} (Note 1) | {3, ..., 14} | {3, ..., 14} | {0, 1, 2, 3,} (Note 1) | {3, ..., 12} | {3, ..., 12} |
| Type B | {0, ..., 12} | {2, ..., 13} | {2, ..., 14} | {0, ..., 10} | {2, 4, 6} | {2, ..., 12} |

(Note 1):
$S_x = 3$ only if dmrs-TypeA-Position = 3

In this example, the SLIV mapping may follow different types of mapping called Type A and Type B. These types may be defined by a demodulation reference signal (DMRS) type used in the PSSCH. For example, the PSSCH may be Type A when the associated DMRS occupies a third symbol or a fourth symbol of a PSSCH slot. The PSSCH may be Type B when the associated DMRS occupies a first symbol of a PSSCH slot.

Still referring to FIG. 6, the first UE 604a may transmit a first sidelink transmission 608 to the second UE 604. In some examples, the first UE 604a may transmit the first sidelink transmission 608 to the second UE 604 as well as one or more other UEs (not shown). In some examples, the first sidelink transmission 608 may be a transmission over a time window (e.g., a slot, as illustrated in FIGS. 4A-4D).

The time window of the first sidelink transmission 608 may include: (i) a first control channel (e.g., PSCCH of FIGS. 4A, 4B, and 4D, and PSCCH 1 of FIG. 4C) that carries one or more of an offset indicator and/or an SLIV, and (ii) a first data channel (e.g., PSSCH of FIGS. 4A, 4B, and 4D, and PSSCH 1 of FIG. 4C). For example, the first control channel may carry an SLIV that indicates a starting time and a duration of the first data channel within the first sidelink transmission 608. In some examples, the first control channel (including one or more of the offset indicator and/or the SLIV) may be transmitted in a first subchannel during the time window.

In certain aspects, the first UE 604a may transmit a second control channel (e.g., PSSCH 2 of FIG. 4C) within a second subchannel of the same time window that includes the first control channel. For example, if the first UE 604a determines that there is an unoccupied second subchannel adjacent to the first subchannel that contains the first control channel, and the first UE 604a needs to reserve additional resources for transmission, then the first UE 604a may transmit the second control channel in the same time window over the second subchannel using the same time resources. In this manner, the first UE 604a may use the same time window to schedule or reserve multiple time intervals that do not overlap in time, for PSSCH transmissions in one or more of the same time window and/or in another time window in the future.

Similar to the first control channel, the second control channel may carry one or more of an offset indicator and/or an SLIV. In an example, the second control channel may carry an SLIV that indicates a starting time and a duration of the second data channel within the first sidelink transmission 608 of the first time window or, if the second control channel carries an offset indicator, within another time window. Thus, when the second UE 604b receives the first sidelink transmission 608, the second UE 604b may decode the first control channel to determine which resources the first UE 604a has reserved. If the first UE 604a has not reserved resources in an adjacent subchannel during the same time as the first control channel, then the second UE 604b may decode the second PSCCH in the adjacent subchannel, if one exists. In some examples, the second UE 604b may successively decode the PDCCHs, one after another, until no further PDCCH can be decoded. Alternatively, the second UE 604b may decode the PDCCHs of each subchannel simultaneously.

In a second sidelink transmission 610, the second UE 604b may transmit feedback to the first UE 604a in response to the first sidelink transmission 608. For example, the feedback may include a hybrid automatic repeat request (HARQ) configured to provide an acknowledgment (ACK) or negative acknowledgment (NACK) in response to one or more PSSCH transmissions. In some examples, the second UE 604b may transmit the HARQ feedback using PSFCH resources (e.g., PSFCH resources of FIGS. 4A-D). Prior to transmitting feedback, the second UE 604b may first determine which PSFCH resource to use.

In a first example, the second UE 604b may determine a physical resource block (PRB) to use for transmission of the feedback. The second UE 604b may determine the PRB based on both a time window identifier (e.g., a slot index) and a subchannel identifier (e.g., a subchannel index) over which the PSCCH (e.g., SCI1) was transmitted to schedule or reserve the PSSCH that the feedback is in response to. That is, the second UE 604b may map a time window index and a subchannel index to a PRB for transmitting a PSFCH for feedback, wherein the time window index is an index for the time window that carried the PSCCH that reserved the PSSCH, and the subchannel index is an index for the subchannel that carried the same PSCCH. It should be noted that the second UE 604b may be configured with (e.g., as part of the mapping information 606) the PRB mapping.

Once the PRB is determined, the second UE 604b may determine particular PSFCH resources within the PRB for transmitting the feedback. In one example, the mapping information 606 may include a plurality of PSFCH indices and a mapping of the PSFCH indices to particular PSFCH resources within one or more PRBs. The second UE 604b may determine an index of a PSFCH resource to use for transmitting feedback in response to a PSSCH reception using the following equation:

$$(K+M) \bmod (Z \times Y) \qquad \text{Equation 1}$$

Wherein (Z×Y) indicates one or more PSFCH resources that the second UE 604b is configured with (e.g., as part of the mapping information 606), wherein K is a layer 1 (L1) source identifier (ID) (e.g., a source ID of the UE that transmitted the PSSCH, in this example, the first UE 604a), and wherein M is indicative of whether the PSSCH is a unicast or groupcast transmission (e.g., M=0 for unicast, or is a higher layer configured ID for groupcast).

Thus, using this first example, the second UE 604b may not be limited to PSFCH resources of the same time window that contained the PSCCH or PSSCH, or the same subchannel that contained the PSCCH. However, if the first UE 604a transmits multiple PSSCHs in the same time window, then the second UE 604b may determine a PSFCH resource for each of the multiple PSSCHs using a second example described in greater detail below.

In the second example for determining PSFCH resources for transmitting feedback, the second UE 604b may first determine a PRB resource based on both a time window identifier (e.g., a slot index) and a subchannel identifier (e.g., a subchannel index) over which one of the PSSCHs was transmitted. In some examples, the subchannel index corresponds to the subchannel that carried the PSSCH that was first in time relative to other PSSCHs in the same time window. Next, the second UE 604b may determine specific PSFCH resources within the PRB for transmitting feedback using Equation 2 below:

$$(K+M+f(n)) \bmod (Z \times Y) \qquad \text{Equation 2}$$

Wherein n is an index corresponding to one of the multiple PSSCHs within the time window (e.g., a symbol index for a first-in-time symbol of the corresponding PSSCH), and ƒ(n) is a hashing function. The second UE 604b may use Equation 2 to determine PSFCH resources for each of the multiple PSSCHs.

The hashing function corresponding to each PSSCH may be provided by each of the PSSCHs. For example, an SCI2 may be associated with each of the multiple PSSCHs (e.g., an SCI2 may be transmitted within each PSSCH transmission, as illustrated in FIG. 4D). In this example, each of the SCI2's may explicitly provide a particular hashing function corresponding to the PSSCH within which it was transmitted. Thus, when the second UE 604b decodes a particular PSSCH, it also then decodes the hashing function in the SCI2, which it then uses to determine feedback for that particular PSSCH. Accordingly, if the first UE 604a transmits multiple PSSCHs over the same time window, the second UE 604b may still determine PSFCH resources for multiple feedbacks.

Example Sidelink Scheduling of Multiple PSSCHs from Different Transmitters

In some examples, resources may be reserved/scheduled for multiple PSSCHs so that different transmitters (e.g., different UEs) can send the multiple PSSCHs across the same set of subchannels in the same time window.

Figure 7B:
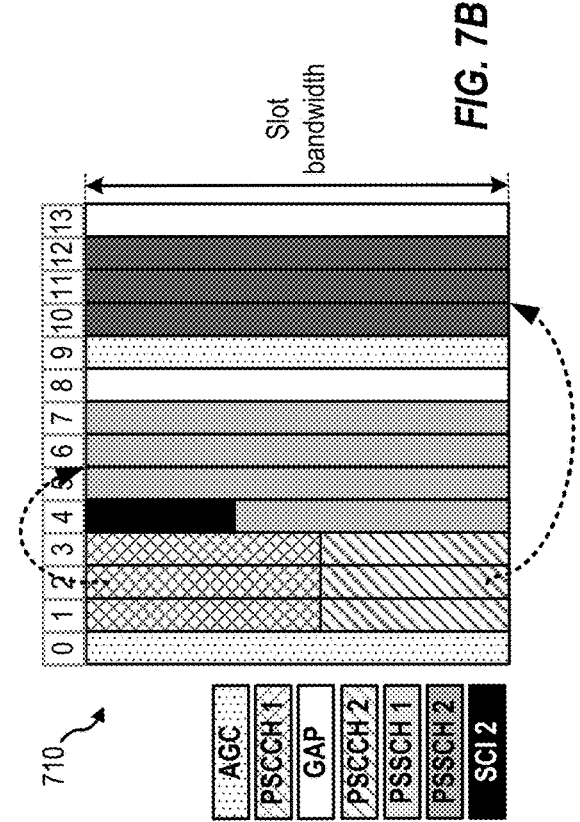
FIGS. 7A and 7B depict various example aspects of data structures for sidelink communications in a wireless communication.
Figure 7A:
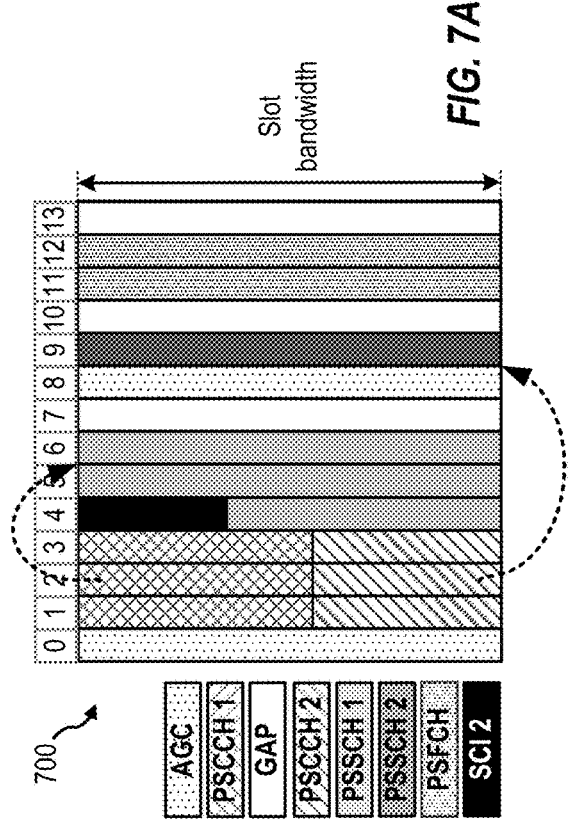

FIGS. 7A and 7B are schematic diagrams illustrating example slot structures for sidelink communications in a wireless communication network, such as wireless communication network 100 of FIG. 1. Each of FIGS. 7A and 7B illustrates an example sidelink slot (700, 710) made up of 14 symbols numbered 0 through 13. The first symbol (e.g., symbol 0) of each sidelink slot may be used as an AGC symbol. Each of the example sidelink slots include a slot bandwidth that may include one or more subchannels. The example slot structures of FIGS. 7A and 7B may be used to transmit data, such as mission critical data in cellular network environments, including V2X and IIoT, for example.

The sidelink slots illustrated in FIGS. 7A and 7B may carry signaling similar to the sidelink slots illustrated in FIGS. 4A-4D described above. For example, the sidelink slots may include a plurality of PSCCHs and PSSCHs, as well as one or more symbols reserved for PSFCH. However, it should be noted that of the plurality of PSSCHs, one or more may be transmitted by a first UE, while another of the plurality of PSSCHs may be transmitted by a second UE. Any unused resources may be padded by the first UE.

FIG. 7A illustrates an example of a fifth sidelink slot 700. As illustrated, symbols 1-3 carry a first PSCCH (e.g., PSCCH 1) and a second PSCCH (e.g., PSCCH 2). The first PSCCH may transmitted over a first subchannel, and the second PSCCH may be transmitted over a second subchannel. Each of the first and second PSCCHs may carry an SCI1 message. The first PSCCH may schedule a first PSSCH (e.g., PSSCH 1) transmitted during symbols 4-6. The first PSSCH may include a first SCI2 message at the earliest symbol. If the UE that scheduled the first PSSCH also scheduled a second PSSCH (e.g., in the same time window), then a second SCI2 message may be concatenated to the first SCI2 message, thereby occurring right after the first SCI2 message. Both the first and second SCI2 messages may be located at the earliest frequency resources after the last symbol of the PSCCHs. The second PSCCH may schedule a second PSSCH (e.g., PSSCH 2) for symbols 8 and 9. As illustrated, symbol 8 may be used as an AGC symbol, and the second PSSCH may be transmitted during symbol 9. Here, the second PSSCH does not include an SCI2 message.

FIG. 7B illustrates an example of a sixth sidelink slot 710. As illustrated, symbols 1-3 carry a first PSCCH (e.g., PSCCH 1) and a second PSCCH (e.g., PSCCH 2). The sixth sidelink slot 710 is similar to the fifth sidelink slot 700; however, in this example, the PSFCH region is absent, and a PSSCH is transmitted in its place.

Figure 8:
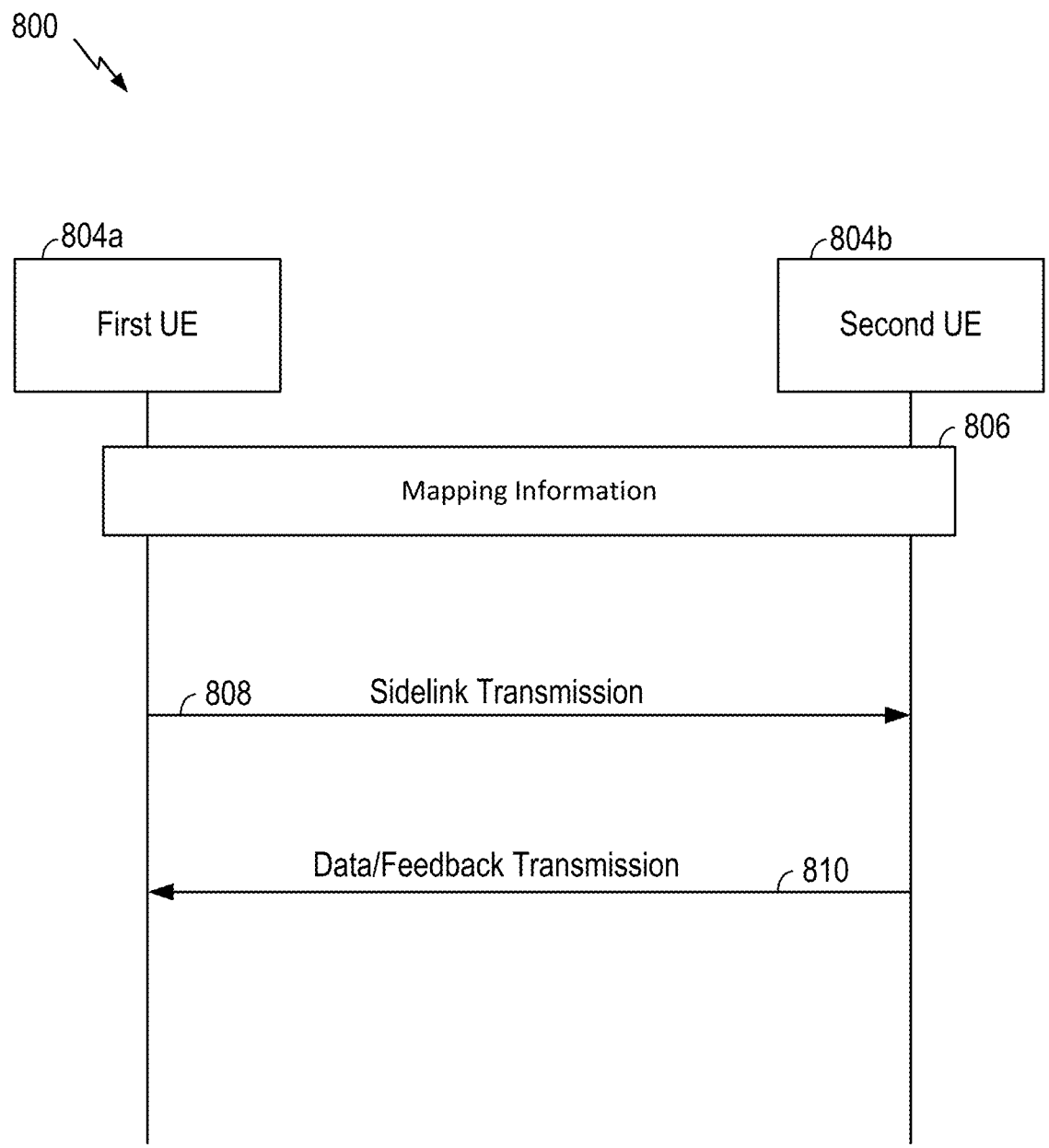
FIG. 8 is a call-flow diagram illustrating sidelink communications between a first UE and a second UE.

FIG. 8 is a call-flow diagram illustrating example communications 800, including sidelink communications (e.g., sidelink communications 158 of FIG. 1), between a first UE 804a and a second UE 804b. In certain aspects, the first UE 804a and the second UE 804b may be the UE 104 of FIGS. 1 and 2, as described in greater detail above. The first UE 804a and the second UE 804b may perform sidelink communication over a wireless interface (e.g., a PC5 interface).

Initially, the first UE 804a and the second UE 804b may be configured with mapping information 806 for scheduling sidelink communications. Configuration of the UEs with mapping information is described in greater detail above in reference to FIG. 6, and thus, will not be repeated here.

Still referring to FIG. 8, the first UE 804a may transmit a first sidelink transmission 808 to the second UE 804b. In some examples, the first UE 804a may transmit the first sidelink transmission 808 to the second UE 804 as well as one or more other UEs (not shown). In some examples, the first sidelink transmission 808 may be a transmission over a time window (e.g., a slot, as illustrated in FIGS. 7A and 7B).

The first UE 804a may construct the first transmission 808 such that it includes a first PSCCH at the beginning of a first time window, wherein the first PSCCH schedules a first PSSCH in the same first time window. The first UE 804a may schedule multiple PSSCHs in the same first time window or in a future time window using additional PSCCHs. For example, a second PSCCH may be added to the first time window using another subchannel relative to the first PSCCH. That is, the first time window may include multiple PSCCHs, wherein the first PSCCH occupies a first subchannel, and the second PSCCH occupies a second subchannel adjacent to the first subchannel. In some examples, each of the PSCCHs in the first time window indicate a location (e.g., time-domain and frequency-domain resources) of a PSSCH within the same first time window as the multiple PSCCHs.

An SCI1 may be carried by each of the PSCCHs in the first time window, and an SCI2 may be associated with one or more PSSCHs in the first time window. A source ID (e.g., and identifier of the transmitting first UE 804a) and a destination ID (e.g., an identifier of the receiving second UE 804b) may be included in the SCI1 or the SCI2. In some examples, the first UE 804a may transmit padding over any unused resources in the first time window.

The second UE 804b may receive the first transmission 808 via the first time window, and decode each of the PSCCHs therein. In some examples, the one or more of the SCI1 and/or SCI2 may indicate that the second UE 804b is a transmitter of a PSSCH in the first time window (e.g., the first UE 804a scheduled the second UE 804b to transmit). In this example, the SCI1 and/or SCI2 may include an indication of a source ID corresponding to the second UE 804b, wherein the indication notifies the second UE 804b that it is a transmitter for a particular set of time-domain and frequency-domain resources reserved by the first UE 804a within the first time window. The SCI1 of the first transmission 808 may also include an SLIV reserving the particular set of time-domain and frequency-domain resources within the first time window allocated for transmission by the second UE 804b. Thus, in a second transmission 810, the second UE 804b may transmit a PSSCH during the first time window. In some examples, the second UE 804b may transmit the PSSCH without an SCI, and/or with an AGC symbol at the beginning of the PSSCH.

It should be noted that in certain aspects the first UE 804a may schedule the second UE 804b to transmit PSSCH in response to a scheduling request received from the second UE 804b. In some examples, the first UE 804a may schedule the second UE 804b for retransmission of PSSCH if an initial PSSCH transmission from the second UE 804b fails. In certain aspects, the first UE 804a may poll the second UE 804b prior to scheduling to see whether the second UE 804b has data to transmit.

In another example, the one or more of the SCI1 and/or SCI2 may indicate that the second UE 804b is a receiver of a PSSCH in the first time window. In this example, the second UE 804b may receive the PSSCH carried by the first transmission 808, then transmit feedback in the second transmission 810. The second UE 804b may transmit the feedback using PRB resources determined using Equations 1 or 2 as described above.

Figure 9:
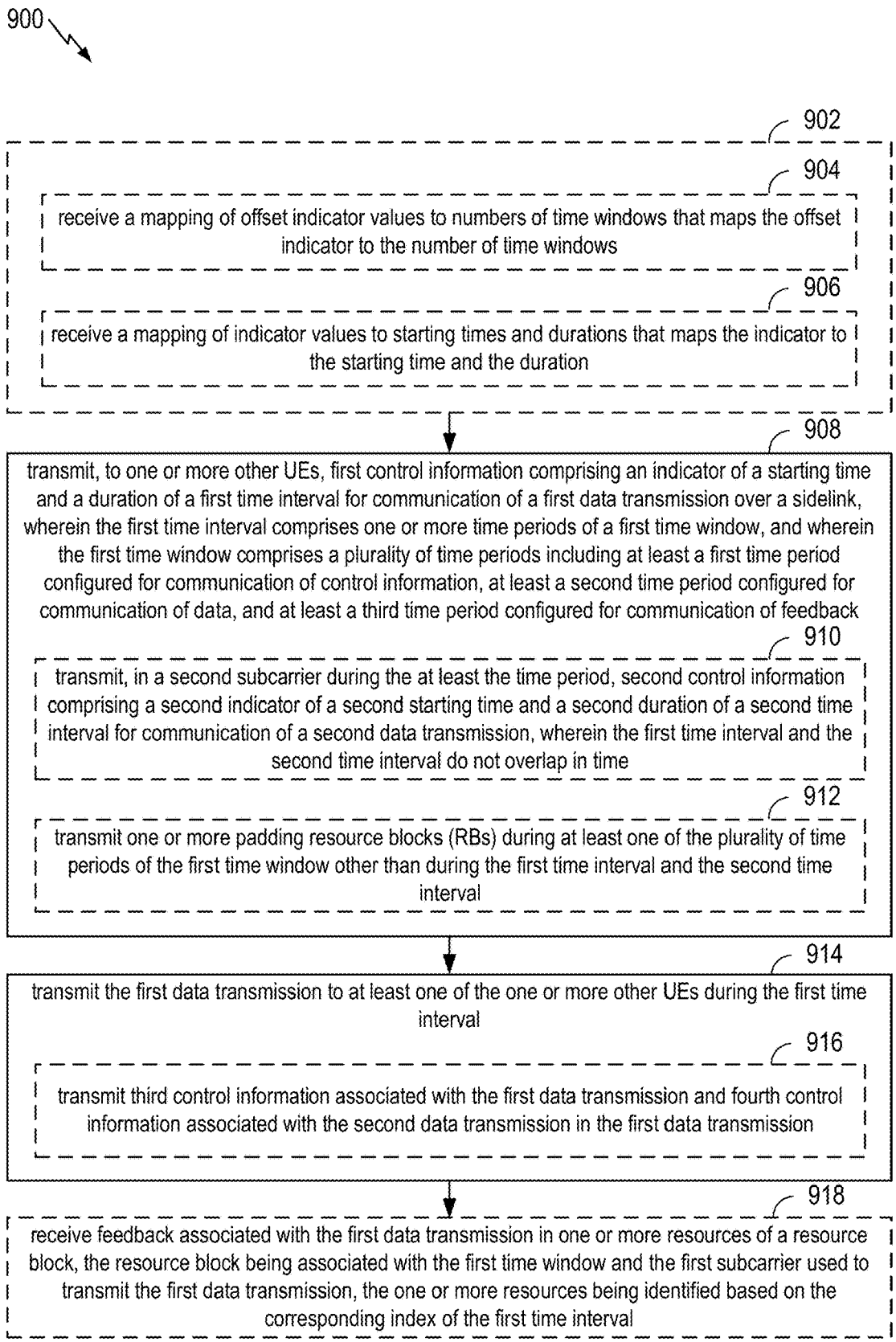
FIG. 9 is a flow diagram illustrating example operations by a first UE.

FIG. 9 is a flow diagram illustrating example operations 900 for wireless communication, in accordance with certain aspects of the present disclosure. The operations 900 may be performed, for example, by a UE (e.g., such as the UE 104 in the wireless communication network 100 of FIG. 1, or the first UE (604a/804a) of FIGS. 6 and 8. The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Optionally, the operations 900 may include, at a first block 902, receiving mapping information. In some examples, the first block 902 includes one or more of a first sub-block 904 or a second sub-block 906. The first sub-block 904 may be for receiving a mapping of offset indicator values to numbers of time windows that maps the offset indicator to the number of time windows. The second sub-block 906 may be for receiving a mapping of indicator values to starting times and durations that maps the indicator to the starting time and the duration.

In certain aspects, the operations 900 may include, at a second block 908, transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback.

Optionally, the second block 908 may include one or more of a third sub-block 910 or a fourth sub-block 912. In certain aspects, the first control information may optionally be transmitted in a first subchannel during a time period. In such an example, the third sub-block 910 may be for transmitting, in a second subchannel during the at least the time period, second control information comprising a second indicator of a second starting time and a second duration of a second time interval for communication of a second data transmission, wherein the first time interval and the second time interval do not overlap in time. In certain aspects, the second time interval may optionally comprise a second one or more time periods of the first time window. In such an example, the fourth sub-block 912 may be for transmitting one or more padding resource blocks (RBs) during at least one of the plurality of time periods of the first time window other than during the first time interval and the second time interval.

The operations 900 may proceed to a third block 914 by transmitting the first data transmission to at least one of the one or more other UEs during the first time interval. Optionally, the fourth block 914 may include a fifth sub-block 916 for transmitting third control information associated with the first data transmission and fourth control information associated with the second data transmission in the first data transmission.

In certain aspects, each of the first time interval and the second time interval may optionally be associated with a corresponding index. In such an example, the operations 900 may include a fourth block 918 for receiving feedback associated with the first data transmission in one or more resources of a resource block, the resource block being associated with the first time window and the first subchannel used to transmit the first data transmission, the one or more resources being identified based on the corresponding index of the first time interval.

In certain aspects, the operations 900 may optionally include receiving feedback associated with the first data transmission in one or more resources of a resource block, the resource block being associated with the first time window and the first subchannel used to transmit the first data transmission, the one or more resources being identified based on an indication included in third control information included in the first data transmission.

In certain aspects, the operations 900 may optionally include receiving feedback associated with the first data transmission in one or more resources of a resource block, the resource block being associated with a time window used to transmit the first control information and a first subchannel used to transmit the first control information.

In certain aspects, the first time window is one of a plurality of periodically occurring time windows; the first control information is transmitted in one of the plurality of periodically occurring time windows that occurs in time prior to the first time window; and the first control information further comprises an offset indicator indicative of a number of time windows between the one of the plurality of periodically occurring time windows and the first time window.

In certain aspects, the first control information is transmitted during the at least the first time period of the first time window.

In certain aspects, the second time interval comprises second one or more time periods of the first time window or one or more time periods of a second time window.

In certain aspects, the second data transmission is scheduled for transmission by a second UE.

In certain aspects, the second data transmission does not include control information.

In certain aspects, each of the first data transmission and the second data transmission comprises a corresponding automatic gain control symbol.

Figure 10:
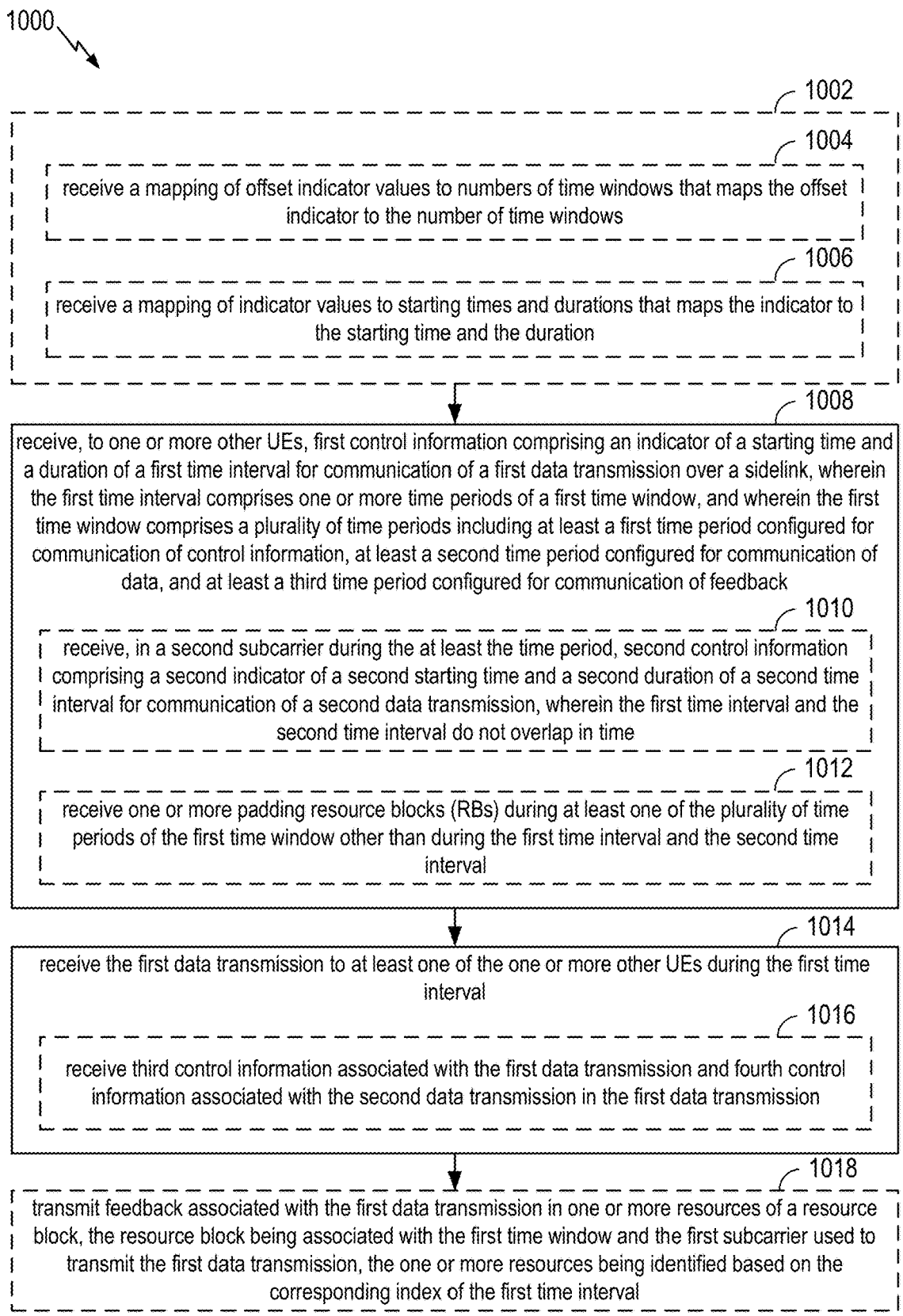
FIG. 10 is a flow diagram illustrating example operations by a second UE.

FIG. 10 is a flow diagram illustrating example operations 1000 for wireless communication, in accordance with certain aspects of the present disclosure. The operations 1000 may be performed, for example, by a UE (e.g., such as the UE 104 in the wireless communication network 100 of FIG. 1, or the second UE (604*b*/804*b*) of FIGS. 6 and 8. The operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. The operations 1000 may be complementary to the operations 900 of FIG. 9 performed by the UE.

Optionally, the operations 1000 may include, at a first block 1002, receiving mapping information. In some examples, the first block 1002 includes one or more of a first sub-block 1004 or a second sub-block 1006. The first sub-block 1004 may be for receiving a mapping of offset indicator values to numbers of time windows that maps the offset indicator to the number of time windows. The second sub-block 1006 may be for receiving a mapping of indicator values to starting times and durations that maps the indicator to the starting time and the duration.

In certain aspects, the operations 1000 may include, at a second block 1008, receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback.

Optionally, the second block 1008 may include one or more of a third sub-block 1010 or a fourth sub-block 1012. For example, the first control information may be received in a first subchannel during a time period. In such an example, the operations 1000 may include the third sub-block 1010 for receiving, in a second subchannel during the at least the time period, second control information comprising a second indicator of a second starting time and a second duration of a second time interval for communication of a second data transmission, wherein the first time interval and the second time interval do not overlap in time.

In another example, the second time interval may include second one or more time periods of the first time window. In such an example, the operations 1000 may include the fourth sub-block 1012 for receiving one or more padding resource blocks (RBs) during at least one of the plurality of time periods of the first time window other than during the first time interval and the second time interval.

The operations 1000 may proceed, at a third block 1014, by receiving the first data transmission from the other UE during the first time interval. Optionally, the third block 1014 may include a fifth sub-block 1016 for receiving third control information associated with the first data transmission and fourth control information associated with the second data transmission in the first data transmission.

Optionally, each of the first time interval and the second time interval are associated with a corresponding index. In such an example, the operations 1000 may include a fourth block 1018 for transmitting feedback associated with the first data transmission in one or more resources of a resource block, the resource block being associated with the first time window and the first subchannel used to transmit the first data transmission, the one or more resources being identified based on the corresponding index of the first time interval.

In certain aspects, the operations 1000 may include transmitting feedback associated with the first data transmission in one or more resources of a resource block, the resource block being associated with the first time window and the first subchannel used to transmit the first data transmission, the one or more resources being identified based on an indication included in third control information included in the first data transmission.

In certain aspects, the operations 1000 may include transmitting feedback associated with the first data transmission in one or more resources of a resource block, the resource block being associated with a time window used to receive the first control information and a first subchannel used to receive the first control information.

In certain aspects, the first time window is one of a plurality of periodically occurring time windows; the first control information is transmitted in one of the plurality of periodically occurring time windows that occurs in time prior to the first time window; and the first control information further comprises an offset indicator indicative of a number of time windows between the one of the plurality of periodically occurring time windows and the first time window.

In certain aspects, the first control information is received during the at least the first time period of the first time window.

In certain aspects, the second time interval comprises second one or more time periods of the first time window or one or more time periods of a second time window.

In certain aspects, the second data transmission is scheduled for transmission by the first UE.

In certain aspects, the second data transmission does not include control information.

In certain aspects, each of the first data transmission and the second data transmission comprises a corresponding automatic gain control symbol.

Example Wireless Communication Devices

Figure 11:
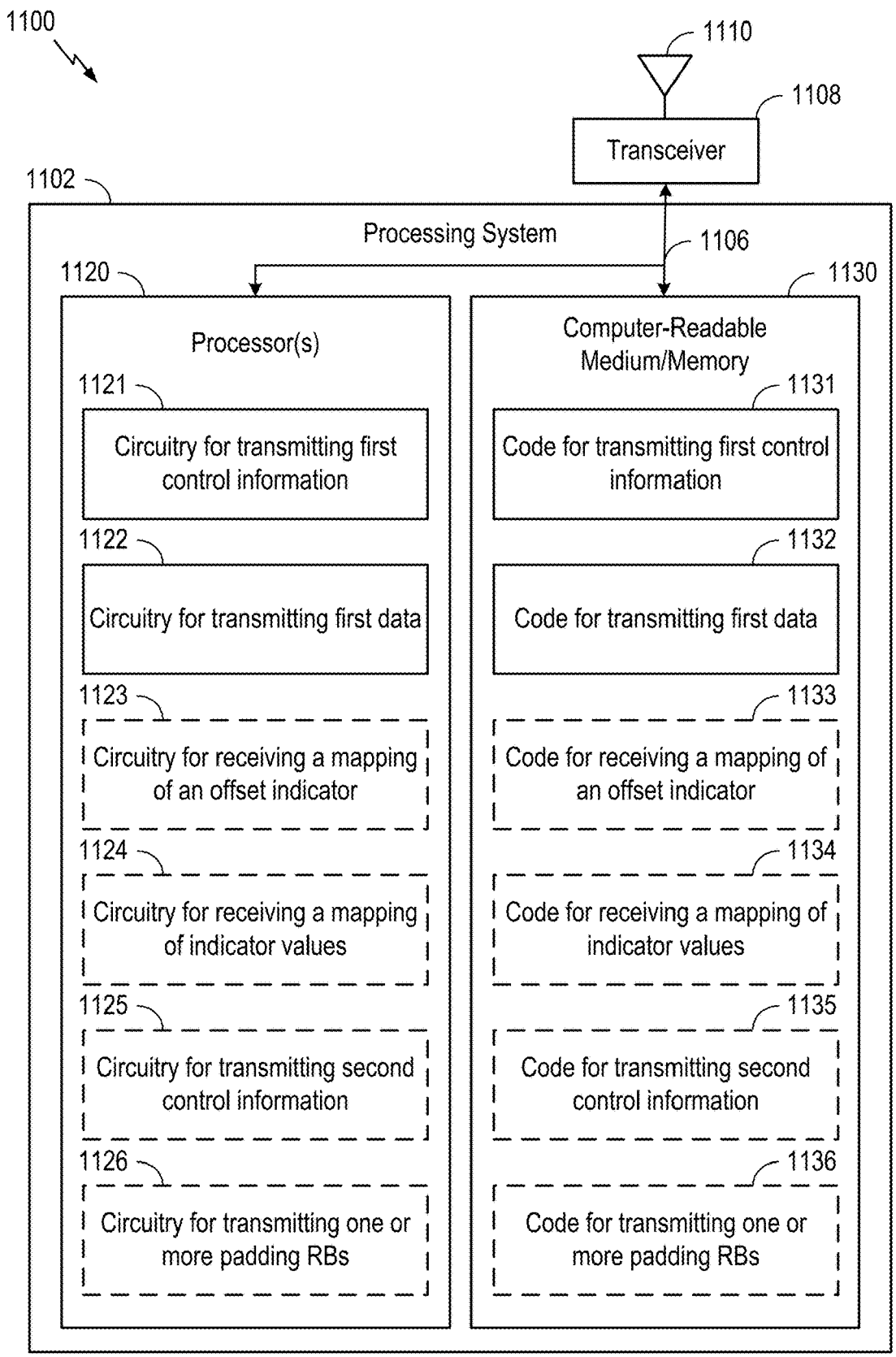
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 6, 8, and 9. In some examples, communication device 1100 may be a user equipment 104 as described, for example with respect to FIGS. 1, 2, 6, and 8.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 6, 8, and 9, or other operations for performing the various techniques discussed herein for scheduling and communicating over sidelink.

In the depicted example, computer-readable medium/memory 1130 stores code 1131 for transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback.

In some examples, the computer-readable medium/memory 1130 stores code 1132 for transmitting the first data transmission to at least one of the one or more other UEs during the first time interval.

Optionally, the computer-readable medium/memory 1130 may store code 1133 for receiving a mapping of offset indicator values to numbers of time windows that maps the offset indicator to the number of time windows.

Optionally, the computer-readable medium/memory 1130 may store code 1134 for receiving a mapping of indicator values to starting times and durations that maps the indicator to the starting time and the duration.

Optionally, the computer-readable medium/memory 1130 may store code 1135 for transmitting, in a second subchannel during the at least the time period, second control information comprising a second indicator of a second starting time and a second duration of a second time interval for communication of a second data transmission, wherein the first time interval and the second time interval do not overlap in time.

Optionally, the computer-readable medium/memory 1130 may store code 1136 for transmitting one or more padding resource blocks (RBs) during at least one of the plurality of time periods of the first time window other than during the first time interval and the second time interval.

In the depicted example, the one or more processors 1120 include circuitry configured to implement the code stored in the computer-readable medium/memory 1130, including circuitry 1121 for transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback.

The one or more processors 1120 also include circuitry 1122 for transmitting the first data transmission to at least one of the one or more other UEs during the first time interval.

Optionally, the one or more processors 1120 may include circuitry 1123 for receiving a mapping of offset indicator values to numbers of time windows that maps the offset indicator to the number of time windows.

Optionally, the one or more processors 1120 may include circuitry 1124 for receiving a mapping of indicator values to starting times and durations that maps the indicator to the starting time and the duration.

Optionally, the one or more processors 1120 may include circuitry 1125 for transmitting, in a second subchannel during the at least the time period, second control information comprising a second indicator of a second starting time and a second duration of a second time interval for communication of a second data transmission, wherein the first time interval and the second time interval do not overlap in time.

Optionally, the one or more processors 1120 may include circuitry 1126 for transmitting one or more padding resource blocks (RB s) during at least one of the plurality of time periods of the first time window other than during the first time interval and the second time interval.

Various components of communications device 1100 may provide means for performing the methods described herein, including with respect to FIGS. 6, 8, and 9.

In some examples, means for transmitting or sending (or means for outputting for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 1108 and antenna 1110 of the communication device 1100 in FIG. 11.

In some examples, means for determining may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including the sidelink communication manager 198).

Notably, FIG. 11 is an example, and many other examples and configurations of communication device 1100 are possible.

Figure 12:
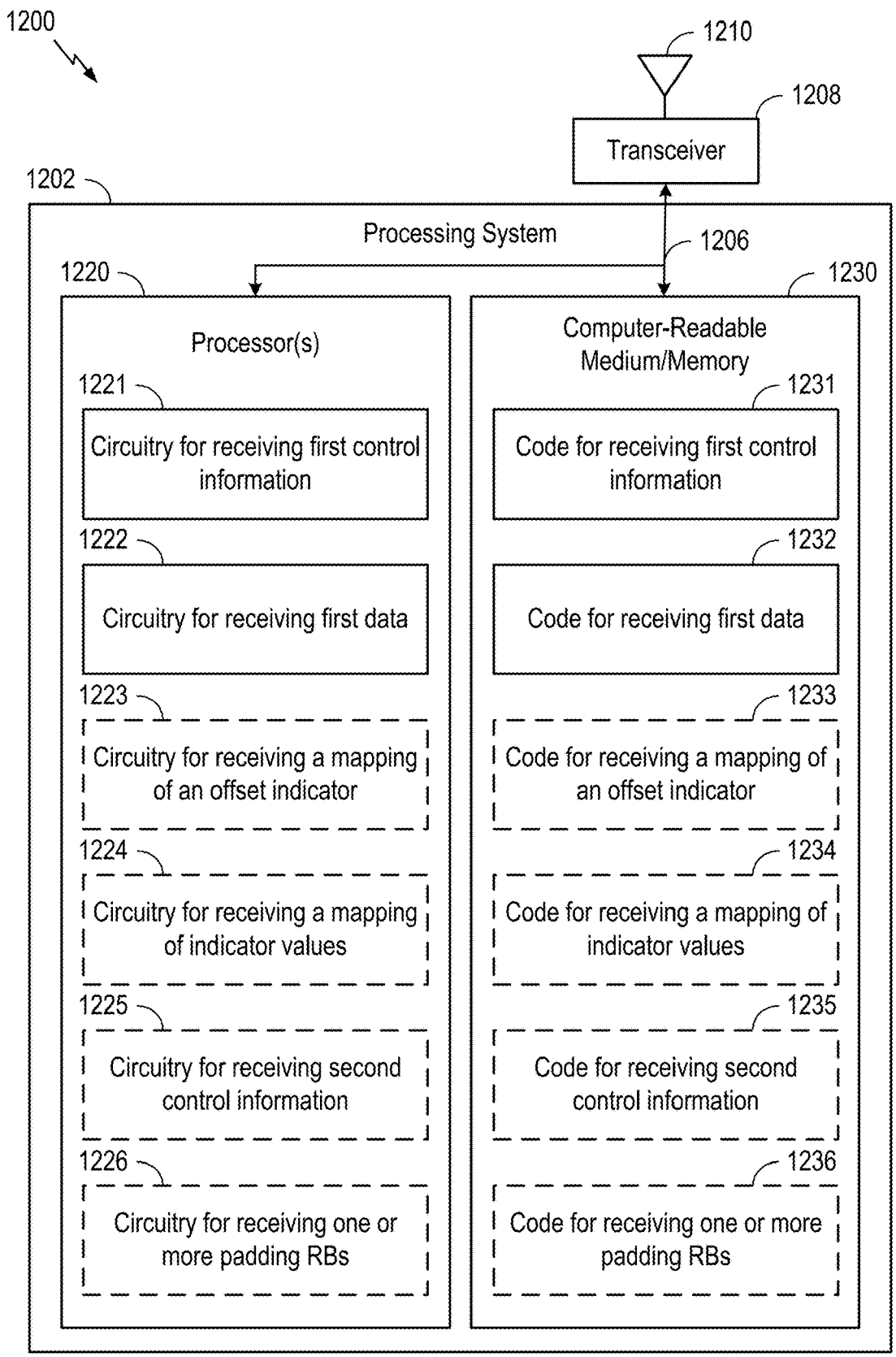
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 6, 8, and 10. In some examples, communication device 1200 may be a user equipment 104 as described, for example with respect to FIGS. 1, 2, 6, and 8.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 6, 8, and 10, or other operations for performing the various techniques discussed herein for herein for scheduling and communicating over sidelink.

In the depicted example, computer-readable medium/memory 1230 stores code 1231 for receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback.

The computer-readable medium/memory 1230 also stores code 1232 for receiving the first data transmission from the other UE during the first time interval.

Optionally, the computer-readable medium/memory 1230 may store code 1233 for receiving a mapping of offset indicator values to numbers of time windows that maps the offset indicator to the number of time windows.

Optionally, the computer-readable medium/memory 1230 may store code 1234 for receiving a mapping of indicator values to starting times and durations that maps the indicator to the starting time and the duration.

Optionally, the computer-readable medium/memory 1230 may store code 1235 for receiving, in a second subchannel during the at least the time period, second control information comprising a second indicator of a second starting time and a second duration of a second time interval for communication of a second data transmission, wherein the first time interval and the second time interval do not overlap in time.

Optionally, the computer-readable medium/memory 1230 may store code 1236 for receiving one or more padding resource blocks (RBs) during at least one of the plurality of time periods of the first time window other than during the first time interval and the second time interval.

In the depicted example, the one or more processors 1220 include circuitry configured to implement the code stored in the computer-readable medium/memory 1230, including circuitry 1221 for receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback.

The one or more processors 1220 may also include circuitry 1222 for receiving the first data transmission from the other UE during the first time interval.

Optionally, the one or more processors 1220 may include circuitry 1223 for receiving a mapping of offset indicator values to numbers of time windows that maps the offset indicator to the number of time windows.

Optionally, the one or more processors 1220 may include circuitry 1224 for receiving a mapping of indicator values to starting times and durations that maps the indicator to the starting time and the duration.

Optionally, the one or more processors 1220 may include circuitry 1225 for receiving, in a second subchannel during the at least the time period, second control information comprising a second indicator of a second starting time and a second duration of a second time interval for communication of a second data transmission, wherein the first time interval and the second time interval do not overlap in time.

Optionally, the one or more processors 1220 may include circuitry 1226 for receiving one or more padding resource blocks (RBs) during at least one of the plurality of time periods of the first time window other than during the first time interval and the second time interval.

Various components of communications device 1200 may provide means for performing the methods described herein, including with respect to FIGS. 6, 8, and 10.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

In some examples, means for determining may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including the sidelink communication manager 198).

Notably, FIG. 12 is an example, and many other examples and configurations of communication device 1200 are possible.

Example Clauses

Implementation examples are described in the following numbered clauses:

Clause 1. A method of wireless communication by a first user equipment (UE), comprising: transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback; and transmitting the first data transmission to at least one of the one or more other UEs during the first time interval.

Clause 2. The method of clause 1, wherein: the first time window is one of a plurality of periodically occurring time windows; the first control information is transmitted in one of the plurality of periodically occurring time windows that occurs in time prior to the first time window; and the first control information further comprises an offset indicator indicative of a number of time windows between the one of the plurality of periodically occurring time windows and the first time window.

Clause 3. The method of one or more of clauses 1 or 2, further comprising: receiving a mapping of offset indicator values to numbers of time windows that maps the offset indicator to the number of time windows.

Clause 4. The method of one or more of clauses 1-3, wherein the first control information is transmitted during the at least the first time period of the first time window.

Clause 5. The method of one or more of clauses 1-4, further comprising: receiving a mapping of indicator values to starting times and durations that maps the indicator to the starting time and the duration.

Clause 6. The method of one or more of clauses 1-5, wherein the first control information is transmitted in a first subchannel during a time period, and wherein the method further comprises: transmitting, in a second subchannel during the at least the time period, second control information comprising a second indicator of a second starting time and a second duration of a second time interval for communication of a second data transmission, wherein the first time interval and the second time interval do not overlap in time.

Clause 7. The method of one or more of clauses 1-6, wherein the second time interval comprises second one or more time periods of the first time window or one or more time periods of a second time window.

Clause 8. The method of one or more of clauses 1-7, wherein the second data transmission is scheduled for transmission by a second UE.

Clause 9. The method of one or more of clauses 1-8, wherein the second data transmission does not include control information.

Clause 10. The method of one or more of clauses 1-9, wherein the second time interval comprises second one or more time periods of the first time window, and wherein the method further comprises: transmitting one or more padding resource blocks (RBs) during at least one of the plurality of time periods of the first time window other than during the first time interval and the second time interval.

Clause 11. The method of one or more of clauses 1-10, wherein each of the first time interval and the second time interval are associated with a corresponding index, and wherein the method further comprises: receiving feedback associated with the first data transmission in one or more resources of a resource block, the resource block being associated with the first time window and the first subchannel used to transmit the first data transmission, the one or more resources being identified based on the corresponding index of the first time interval.

Clause 12. The method of one or more of clauses 1-11, further comprising: receiving feedback associated with the first data transmission in one or more resources of a resource block, the resource block being associated with the first time window and the first subchannel used to transmit the first data transmission, the one or more resources being identified based on an indication included in third control information included in the first data transmission.

Clause 13. The method of one or more of clauses 1-12, and wherein the method further comprises: transmitting third control information associated with the first data transmission and fourth control information associated with the second data transmission in the first data transmission.

Clause 14. The method of one or more of clauses 1-13, wherein each of the first data transmission and the second data transmission comprises a corresponding automatic gain control symbol.

Clause 15. The method of one or more of clauses 1-14, and wherein the method further comprises: receiving feedback associated with the first data transmission in one or more resources of a resource block, the resource block being associated with a time window used to transmit the first control information and a first subchannel used to transmit the first control information.

Clause 16. A method of wireless communication by a first user equipment (UE), comprising: receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback; and receiving the first data transmission from the other UE during the first time interval.

Clause 17. The method of clause 16, wherein: the first time window is one of a plurality of periodically occurring time windows; the first control information is transmitted in one of the plurality of periodically occurring time windows that occurs in time prior to the first time window; and the first control information further comprises an offset indicator indicative of a number of time windows between the one of the plurality of periodically occurring time windows and the first time window.

Clause 18. The method of one or more of clauses 16 or 17, further comprising: receiving a mapping of offset indicator values to numbers of time windows that maps the offset indicator to the number of time windows.

Clause 19. The method of one or more of clauses 16-18, wherein the first control information is received during the at least the first time period of the first time window.

Clause 20. The method of one or more of clauses 16-19, further comprising: receiving a mapping of indicator values to starting times and durations that maps the indicator to the starting time and the duration.

Clause 21. The method of one or more of clauses 16-20, wherein the first control information is received in a first subchannel during a time period, and wherein the method further comprises: receiving, in a second subchannel during the at least the time period, second control information comprising a second indicator of a second starting time and a second duration of a second time interval for communication of a second data transmission, wherein the first time interval and the second time interval do not overlap in time.

Clause 22. The method of one or more of clauses 16-21, wherein the second time interval comprises second one or more time periods of the first time window or one or more time periods of a second time window.

Clause 23. The method of one or more of clauses 16-22, wherein the second data transmission is scheduled for transmission by the first UE.

Clause 24. The method of one or more of clauses 16-23, wherein the second data transmission does not include control information.

Clause 25. The method of one or more of clauses 16-24, wherein the second time interval comprises second one or more time periods of the first time window, and wherein the method further comprises: receiving one or more padding resource blocks (RBs) during at least one of the plurality of time periods of the first time window other than during the first time interval and the second time interval.

Clause 26. The method of one or more of clauses 16-25, wherein each of the first time interval and the second time interval are associated with a corresponding index, and wherein the method further comprises: transmitting feedback associated with the first data transmission in one or more resources of a resource block, the resource block being associated with the first time window and the first subchannel used to transmit the first data transmission, the one or more resources being identified based on the corresponding index of the first time interval.

Clause 27. The method of one or more of clauses 16-26, and wherein the method further comprises: transmitting feedback associated with the first data transmission in one or more resources of a resource block, the resource block being associated with the first time window and the first subchannel used to transmit the first data transmission, the one or more resources being identified based on an indication included in third control information included in the first data transmission.

Clause 28. The method of one or more of clauses 16-27, and wherein the method further comprises: receiving third control information associated with the first data transmission and fourth control information associated with the second data transmission in the first data transmission.

Clause 29: An apparatus, comprising: a memory comprising executable instructions; one or more processors configured to execute the executable instructions and cause the apparatus to perform a method in accordance with any one or more of clauses 1-15 or 16-28.

Clause 30: An apparatus, comprising means for performing a method in accordance with any one or more of clauses 1-15 or 16-28.

Clause 31: A non-transitory computer-readable medium comprising executable instructions that, when executed by one or more processors of an apparatus, cause the apparatus to perform a method in accordance with any one or more of clauses 1-15 or 16-28.

Clause 32: A computer program product embodied on a computer-readable storage medium comprising code for performing a method in accordance with any one or more of clauses 1-15 or 16-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of scheduling sidelink communications in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first user equipment (UE) configured for wireless communication, the first UE comprising:
   a memory; and
   one or more processors coupled to the memory, the one or more processors configured to cause the first UE to:
      transmit, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback, wherein the first time window comprises a slot including the control information, the data, and the feedback, wherein the first control information is transmitted in a first subchannel during a time period of the slot, and wherein the first time window further includes second control information transmitted in a second subchannel during at least a portion of the time period, wherein the first data transmission is on a physical sidelink shared channel (PSSCH) including third control information, the third control information being on a symbol first in time after a symbol carrying the first control information; and transmit the first data transmission to at least one of the one or more other UEs during the first time interval.

2. The first UE of claim 1, wherein:
the first time window is one of a plurality of periodically occurring time windows;
the one or more processors are configured to cause the first UE to transmit the first control information in one of the plurality of periodically occurring time windows that occurs in time prior to the first time window; and
the first control information further comprises an offset indicator indicative of a number of time windows between the one of the plurality of periodically occurring time windows and the first time window.

3. The first UE of claim 2, wherein the one or more processors are further configured to cause the first UE to:
receive a mapping of offset indicator values to numbers of time windows that maps the offset indicator to the number of time windows.

4. The first UE of claim 1, wherein the first control information is transmitted during the at least the first time period of the first time window.

5. The first UE of claim 1, wherein the one or more processors are further configured to cause the first UE to:
receive a mapping of indicator values to starting times and durations that maps the indicator to the starting time and the duration.

6. The first UE of claim 1, wherein the one or more processors are further configured to cause the first UE to:
transmit, in the second subchannel, the second control information comprising a second indicator of a second starting time and a second duration of a second time interval for communication of a second data transmission, wherein the first time interval and the second time interval do not overlap in time.

7. The first UE of claim 6, wherein the second time interval comprises second one or more time periods of the first time window or one or more time periods of a second time window.

8. The first UE of claim 7, wherein the second data transmission is scheduled for transmission by a second UE.

9. The first UE of claim 7, wherein the second data transmission does not include control information.

10. The first UE of claim 6, wherein the second time interval comprises second one or more time periods of the first time window, and wherein the one or more processors are further configured to cause the first UE to:
transmit one or more padding resource blocks (RBs) during at least one of the plurality of time periods of the first time window other than during the first time interval and the second time interval.

11. The first UE of claim 6, wherein each of the first time interval and the second time interval are associated with a corresponding index, and wherein the one or more processors are further configured to cause the first UE to:
receive feedback associated with the first data transmission in one or more resources of a resource block, the resource block being associated with the first time window and the first subchannel used to transmit the first data transmission, the one or more resources being identified based on the corresponding index of the first time interval.

12. The first UE of claim 6, wherein the one or more processors are further configured to cause the first UE to:
receive feedback associated with the first data transmission in one or more resources of a resource block, the resource block being associated with the first time window and the first subchannel used to transmit the first data transmission, the one or more resources being identified based on an indication included in third control information included in the first data transmission.

13. The first UE of claim 6, wherein the one or more processors are further configured to cause the first UE to:
transmit the third control information associated with the first data transmission and fourth control information associated with the second data transmission in the first data transmission.

14. The first UE of claim 6, wherein each of the first data transmission and the second data transmission comprises a corresponding automatic gain control symbol.

15. The first UE of claim 1, wherein the one or more processors are further configured to cause the first UE to:
receive feedback associated with the first data transmission in one or more resources of a resource block, the resource block being associated with a time window used to transmit the first control information and the first subchannel used to transmit the first control information.

16. The first UE of claim 1, wherein fourth control information is concatenated with the third control information.

17. The first UE of claim 16, wherein the fourth control information is concatenated with the third control information based on the second control information scheduling a second data transmission.

18. A first user equipment (UE) configured for wireless communication, the first UE comprising:
a memory; and
one or more processors coupled to the memory, the one or more processors configured to cause the first UE to:
receive, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback, wherein the first time window comprises a slot including the control information, the data, and the feedback, wherein the first control information is received in a first subchannel during a time period of the slot, and wherein the first time window further includes second control information received in a second subchannel during at least a portion of the time period, wherein the first data transmission is on a physical sidelink shared channel (PSSCH) including third control information, the third control information being on a symbol first in time after a symbol carrying the first control information; and receive the first data transmission from the other UE during the first time interval.

19. The first UE of claim 18, wherein:
the first time window is one of a plurality of periodically occurring time windows;
the one or more processors are configured to cause the first UE to transmit the first control information in one of the plurality of periodically occurring time windows that occurs in time prior to the first time window; and
the first control information further comprises an offset indicator indicative of a number of time windows between the one of the plurality of periodically occurring time windows and the first time window.

20. The first UE of claim 19, wherein the one or more processors are further configured to cause the first UE to:
receive a mapping of offset indicator values to numbers of time windows that maps the offset indicator to the number of time windows.

21. The first UE of claim 18, wherein the first control information is received during the at least the first time period of the first time window.

22. The first UE of claim 18, wherein the one or more processors are further configured to cause the first UE to:
receive a mapping of indicator values to starting times and durations that maps the indicator to the starting time and the duration.

23. The first UE of claim 18, wherein the one or more processors are further configured to cause the first UE to:
receive, in the second subchannel, the second control information comprising a second indicator of a second starting time and a second duration of a second time interval for communication of a second data transmission, wherein the first time interval and the second time interval do not overlap in time.

24. The first UE of claim 23, wherein the second time interval comprises second one or more time periods of the first time window or one or more time periods of a second time window.

25. The first UE of claim 24, wherein the second data transmission is scheduled for transmission by the first UE.

26. The first UE of claim 23, wherein the second time interval comprises second one or more time periods of the first time window, and wherein the one or more processors are further configured to cause the first UE to:
receive one or more padding resource blocks (RBs) during at least one of the plurality of time periods of the first time window other than during the first time interval and the second time interval.

27. The first UE of claim 23, wherein each of the first time interval and the second time interval are associated with a corresponding index, and wherein the one or more processors are further configured to cause the first UE to:
transmit feedback associated with the first data transmission in one or more resources of a resource block, the resource block being associated with the first time window and the first subchannel used to transmit the first data transmission, the one or more resources being identified based on the corresponding index of the first time interval.

28. The first UE of claim 23, wherein the one or more processors are further configured to cause the first UE to:
transmit feedback associated with the first data transmission in one or more resources of a resource block, the resource block being associated with the first time window and the first subchannel used to transmit the first data transmission, the one or more resources being identified based on an indication included in third control information included in the first data transmission.

29. The first UE of claim 23, wherein the one or more processors are further configured to cause the first UE to:
receive the third control information associated with the first data transmission and fourth control information associated with the second data transmission in the first data transmission.

30. A method of wireless communication by a first user equipment (UE), comprising:
transmitting, to one or more other UEs, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback, wherein the first time window comprises a slot including the control information, the data, and the feedback, wherein the first control information is transmitted in a first subchannel during a time period of the slot, and wherein the first time window further includes second control information transmitted in a second subchannel during at least a portion of the time period, wherein the first data transmission is on a physical sidelink shared channel (PSSCH) including third control information, the third control information being on a symbol first in time after a symbol carrying the first control information; and
transmitting the first data transmission to at least one of the one or more other UEs during the first time interval.

31. A method of wireless communication by a first user equipment (UE), comprising:
receiving, from another UE, first control information comprising an indicator of a starting time and a duration of a first time interval for communication of a first data transmission over a sidelink, wherein the first time interval comprises one or more time periods of a first time window, and wherein the first time window comprises a plurality of time periods including at least a first time period configured for communication of control information, at least a second time period configured for communication of data, and at least a third time period configured for communication of feedback, wherein the first time window comprises a slot including the control information, the data, and the feedback, wherein the first control information is received in a first subchannel during a time period of the slot, and wherein the first time window further includes second control information received in a second subchannel during at least a portion of the time period, wherein the first data transmission is on a physical sidelink shared channel (PSSCH) including third control information, the third control information being on a symbol first in time after a symbol carrying the first control information; and
receiving the first data transmission from the other UE during the first time interval.

* * * * *